(12) United States Patent
Chen et al.

(10) Patent No.: US 7,790,798 B2
(45) Date of Patent: Sep. 7, 2010

US007790798B2

(54) SOLUTION MASTERBATCH PROCESS USING FINELY GROUND FILLERS FOR LOW HYSTERESIS RUBBER

(75) Inventors: Zhong-Ren Chen, Stow, OH (US); Sanjeev D. Naik, Arlington, MA (US); William M. Cole, Clinton, OH (US); Georg G. A. Böhm, Akron, OH (US)

(73) Assignee: Bridgestone Corporation (JP)

( * ) Notice: Subject to any disclaimer, the term of this patent is extended or adjusted under 35 U.S.C. 154(b) by 1194 days.

(21) Appl. No.: 11/321,496

(22) Filed: Dec. 29, 2005

(65) Prior Publication Data

US 2007/0155861 A1    Jul. 5, 2007

(51) Int. Cl.
*C08K 3/34* (2006.01)

(52) U.S. Cl. .......................... 524/492; 523/351; 524/493

(58) Field of Classification Search ................. 523/351; 524/492, 493
See application file for complete search history.

(56) References Cited

U.S. PATENT DOCUMENTS

| | | | |
|---|---|---|---|
| 5,929,156 A | 7/1999 | Fultz et al. | 524/492 |
| 5,985,953 A | 11/1999 | Lightsey et al. | 523/212 |
| 6,025,415 A | 2/2000 | Scholl | 523/213 |
| 6,277,902 B1 | 8/2001 | Scholl | 523/213 |
| 6,313,211 B1 | 11/2001 | Scholl et al. | 524/492 |
| 6,407,153 B1 | 6/2002 | Von Hellens | 524/188 |
| 6,420,456 B1 | 7/2002 | Koski | 523/213 |
| 6,437,050 B1 | 8/2002 | Krom et al. | 525/313 |
| 6,489,389 B1 | 12/2002 | Ohta et al. | 524/437 |
| 6,713,534 B2 | 3/2004 | Goerl et al. | 523/333 |
| 6,720,369 B2 | 4/2004 | Goerl et al. | 523/215 |
| 6,736,891 B1 | 5/2004 | Bice et al. | 106/490 |
| 6,822,036 B1 | 11/2004 | Goerl et al. | 524/492 |
| 6,872,785 B2 | 3/2005 | Wang et al. | 525/313 |
| 6,894,089 B2 | 5/2005 | Mei et al. | 523/212 |
| 2003/0114577 A1 | 6/2003 | Yatsuyanagi et al. | 524/495 |

*Primary Examiner*—Edward J Cain
(74) *Attorney, Agent, or Firm*—Thomas R. Kingsbury; Nathan Lewis

(57) ABSTRACT

Methods are provided for making solution masterbatches containing a diene elastomer in an organic solvent and a silica filler, having a first average particle size, that is ground in an organic solvent to form a silica having a reduced second average particle size. Grinding of the silica in the organic solvent, with or without other ingredients including the elastomer, produces a solution masterbatch in which the silica is mixed with and well dispersed in the elastomer. The use of such desolventized solution masterbatches in vulcanizable rubber compounds results in excellent processing characteristics allowing for the reduced use of processing aids such as oil. The compound also demonstrates improved properties, including reduced hysteresis.

38 Claims, 11 Drawing Sheets

SOLUTION MASTERBATCH PROCESS USING FINELY GROUND FILLERS FOR LOW HYSTERESIS RUBBER

BACKGROUND

The invention relates to a solution masterbatch of rubber and fillers for use in compounding rubbers.

When producing elastomeric compositions for use in rubber articles, such as tires, power belts, and the like, it is desirable that these elastomeric compositions are easily processable during compounding and have a high molecular weight with a controlled molecular weight distribution, glass transition temperature ($T_g$) and vinyl content. It is also desirable that reinforcing fillers, such as silica and/or carbon black, be well dispersed throughout the rubber in order to improve various physical properties, such as the compound Mooney viscosity, modulus, tangent delta (tan δ), and the like. Rubber articles, especially tires, produced from vulcanized elastomers exhibiting these improved properties will have reduced hysteresis, improved rolling resistance, snow and ice traction, wet traction, improved wear and improved fuel economy for vehicles equipped with such tires.

The compounding of rubber by conventional means in mixers, such as the Banbury mixer, requires a number of process stages in which raw rubber material in the form of bales undergoes intimate mixing with reinforcing fillers, oils, plasticizers, vulcanization auxiliaries, and other common ingredients used in rubber compounding. Between the process stages, the mixtures are generally cooled on a batch-off system and then may be put into intermediate storage, prior to curing and tire building.

Such conventional rubber compounding processes are time- and energy-consuming, especially when silica is used as a reinforcing filler. In particular, silica particles contain polar silanol groups on the surface and tend to self-associate and reagglomerate extensively after compounding, leading to poor silica dispersion and a high compound viscosity. The strong silica filler network results in a rigid uncured compound that is difficult to process in extrusion and forming operations. Therefore, silica is typically chemically reacted with an organosilane silica coupling agent during the compounding process, requiring more time and energy for processing than compounds employing carbon black as a filler.

To address these problems, efforts have been made to pre-disperse fillers in dried masterbatches made from elastomer dispersions and aqueous dispersions of silica, prior to their use in compounding processes. Although masterbatches providing a mixture of organic solution polymerized elastomers and carbon black have been successful because of the hydrophobic nature of both the elastomer and the carbon black, the use of silica as a filler in a masterbatch has proven to be problematic because silica particles have hydrophilic surface characteristics, resulting in a two-phase system in which the silica is in an aqueous solution and the elastomer is in an organic solvent. Therefore, the use of silica in masterbatches has, for the most part, been limited to (a) mixing the silica with emulsion polymerized elastomers in aqueous solution, (b) hydrophobation of the silica prior to mixing with an elastomer solution-polymerized in an organic solvent, and/or (c) compatibilizing the elastomer for mixing with the silica in an aqueous phase. None of these processes for preparing silica-filled masterbatches has been satisfactory, in that a process such as (a) does not allow for the use of solution polymerized elastomers in organic solvents, and processes such as (b) and (c) have required time-consuming and expensive chemical reactions to compatibilize the reactants.

Therefore, there is still a need to provide solution masterbatches containing natural rubbers or solution polymerized elastomers in organic solvents, and silica and other fillers, that are not complicated or expensive to prepare and that have excellent filler dispersion, to produce rubber compounds having low hysteresis properties and improved processability.

SUMMARY

A method is provided for making a solution masterbatch containing a diene elastomer in an organic solvent and a reinforcing silica filler that is well dispersed in the elastomer, comprising the steps of (a) mixing precipitated silica having a first average particle size in a first organic solvent to form a silica slurry; (b) grinding the silica slurry in a grinding apparatus to form a ground silica slurry having a reduced second average particle size; (c) mixing the ground silica slurry with a diene elastomer in a second organic solvent; and (d) desolventizing the mixture produced in step (c) to form a solution masterbatch preparation. As used in this specification, the terms "grinding," "ground," and the like, are intended to encompass any and all methods of reducing the size of the particles of silica and/or other fillers (such as carbon black, and the like) and/or other ingredients, the methods including, but not limited to, crushing, pulverizing, milling, and the like.

In each of the embodiments of the invention, the silica employed has an first average particle size of about 20 to about 200 microns, suitably about 30 to about 100 microns, often about 50 microns. That is, if pelletized or granulated silica are used, they are first ground or crushed to the aforementioned first average particle size. Grinding of the silica in the embodiments of the invention produces a reduced second particle size of one to about 20 microns, suitably about one to about 10 microns, often about 6 microns.

The steps (a), (b) and (c) of the foregoing method can include the optional substeps of mixing the silica having the first average particle size with optional ingredients selected from the group consisting of one or more additional fillers, one or more additional elastomers, a silica coupling agent, a surfactant, and mixtures thereof, and the steps (a), (b) and (c) can further include the optional substep of grinding the mixture of the silica and the optional ingredients in one or more additional grinding substeps, prior to the desoventizing step (d).

In another embodiment, a method is provided for making a solution masterbatch in which the silica in an organic solvent and having a first average particle size is mixed with one or more elastomers and/or one or more other fillers and/or silica coupling agent(s) and/or other ingredients in one pot, and the entire mixture is ground prior to desolventizing. The mixture of the silica slurry and any of the other ingredients, including reinforcing and/or non-reinforcing fillers, additional elastomers, and the like, can take place in a non-limited number of steps, with grinding of the silica and one or more other ingredients taking place prior to or subsequent to the addition of other ingredients. The number of grinding steps is not limited, nor is the timing of the addition of other ingredients.

In a further embodiment, a method is provided for making a solution masterbatch in which precipitated silica having a first average particle size is mixed directly with one or more elastomers in an organic solvent and/or other ingredients, and the entire mixture is ground prior to desolventizing. As in the previously described embodiment, the silica can be mixed with other ingredients and grinding can take place prior to or subsequent to the addition of other ingredients, and neither the number of grinding steps nor the timing of the addition of other ingredients is limited.

According to embodiments of the invention, the grinding of the silica having the first average particle size in the organic solvent, and/or the grinding of the silica that is directly dispersed in the organic solvent with the elastomer(s) (i.e., grinding of the silica/elastomer mixture), reduces the size of the silica agglomerates such that the silica is more easily and uniformly dispersed in the elastomer(s). Although several grinding apparatuses are suitable for use in embodiments of the invention, a particularly suitable apparatus is a media mill. As a non-limiting example, it has been found that a suitable reduction in the size of the silica agglomerates can be achieved in a media mill in a single pass; however, the embodiments are not intended to be limited to a single pass or to a particular media mill or to a particular grinding apparatus.

A vulcanizable rubber compound having improved silica dispersion and containing a solution masterbatch produced according to the method(s) of the invention is also provided. The compound demonstrates a low Mooney viscosity and excellent processing characteristics, allowing for the reduced use of processing aids such as oil. The compound also demonstrates an increase in bound rubber, reduced filler flocculation after compounding, and improved hysteresis properties, compared with compounds that are prepared by dry mixing of the ingredients. A tire having a tread containing the vulcanized compound will have improved wear resistance, rolling resistance, excellent wet traction and superior handling.

DETAILED DESCRIPTION

Figure 1:
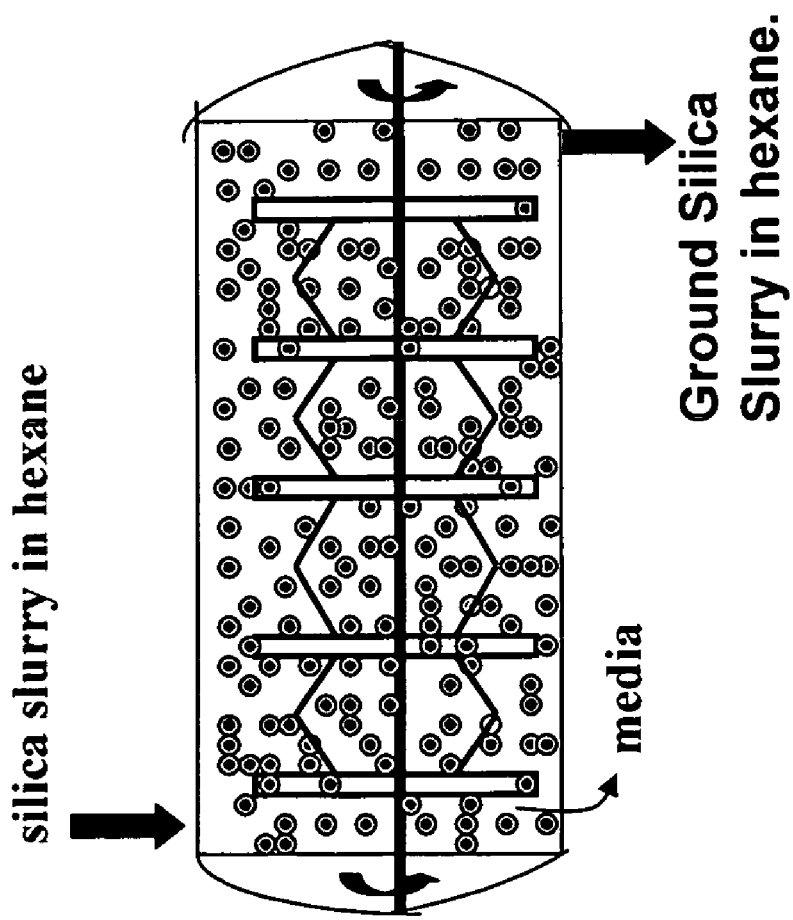
FIG. 1 illustrates media mill grinding of silica slurry in an organic solvent. The media mill grinding reduces the size of the silica agglomerates.

The invention provides methods for making solution masterbatches, containing natural rubbers and/or solution polymerized diene elastomers and silica and/or other fillers and ingredients in organic solvents, that are not complicated or expensive to prepare and that have excellent silica filler dispersion, for use in the production of rubber compounds having low hysteresis properties and improved processability.

In particular, a method is provided for making a solution masterbatch containing a slurry of silica in an organic solvent without the need for pre-treatment to hydrophobize the hydrophilic silica, and intimate mixing of the silica slurry with a diene polymer cement in an organic solvent, followed by desolventization of the solution masterbatch mixture. In one embodiment, the method comprises the steps of (a) mixing precipitated silica having a first average particle size in a first organic solvent to form a silica slurry; (b) grinding the silica slurry in a grinding apparatus to form a ground silica slurry having a reduced second average particle size; (c) mixing the ground silica slurry with a diene elastomer in a second organic solvent; and (d) desolventizing the mixture produced in step (c) to form a solution masterbatch preparation. In a non-limiting example, such a method for making such a solution masterbatch can comprise adding about one weight percent (wt %) to about 45 wt % or, suitably, about 5 wt % to about 30 wt % or, also suitably, about 10 wt % to about 20 wt % of precipitated silica, having a first average particle size, to an organic solvent in a vessel; continuously stirring the mixture in the vessel until the silica is substantially evenly dispersed in the organic solvent to form a silica slurry; feeding the silica slurry into a grinding apparatus while continuing to maintain the dispersion of the silica in the slurry by continuous stirring, to form a ground silica slurry in which the silica has a reduced second average particle size; blending the ground silica slurry with a diene elastomer in an organic solvent; and desolventizing the elastomer/silica blend to form the solution masterbatch. Suitably, the weight percent of the ground silica in the solution masterbatch ranges from about 10 phr to about 120 phr and, also suitably, from about 20 phr to about 85 phr.

A suitable time period for mixing the silica with the organic solvent in the vessel and for the speed of stirring in order to provide excellent dispersion of the silica in the slurry is dependent on the type and size of vessel or reactor employed. As a non-limiting example, when silica is mixed with hexane in a 5 gallon reactor that is 12"×17"—316 stainless steel reactor (The Buckeye Fabricating Co.) at an agitation speed of 10-90 rpm for about one to about 30 minutes, the silica will be adequately dispersed in the solvent by visual examination or by other means such as, but not limited to, determining the wt % of silica in dried samples from the upper and lower parts of the slurry mixture. Suitable time periods and speeds of stirring to provide the desired silica dispersion using different vessels or reactors will be readily apparent to one or ordinary skill in the art from the teachings contained herein, without undue experimentation.

The dispersion of the ground silica in the elastomer can be determined by such exemplary methods as measurement by the use of optical micrographs of samples of the rubber and/or by determining a dispersion index by well known methods.

The embodiments of the invention can employ all types of precipitated silica, including pelletized, granulated and powdered silica. Examples of suitable silicas include, but are not limited to, precipitated amorphous silica, wet silica (hydrated silicic acid), dry silica (anhydrous silicic acid), calcium silicate, and the like. Other suitable fillers include aluminum silicate, magnesium silicate, and the like. Among these, precipitated amorphous wet-process, hydrated silicas are most suitable. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 $m^2/g$ to about 400 $m^2/g$, with the range of about 100 $m^2/g$ to about 250 $m^2/g$, being preferred, and the range of about 150 $m^2/g$ to about 220 $m^2/g$ being most preferred. The pH of the silica filler is generally about 5.5 to about 7 or slightly over, preferably about 5.5 to about 6.8.

For purposes of the embodiments of the present invention, the first average particle size of the silica added to the organic slurry or added to the polymer cement in an organic solvent, prior to grinding, is suitably about 20 to about 200 microns, suitably about 30 to about 100 microns, often about 50 microns. Therefore, it may be necessary to grind or otherwise crush pelletized or granulated silica to achieve the desired first average particle size. Powdered silicas are most suitable in the method because these silicas have a fine particle size and do not usually require pre-grinding or crushing.

Suitable commercially available pelletized, granulated and/or powdered silicas include, but are not limited to, Hi-Sil® 190, Hi-Sil® 210, Hi-Sil® 215, Hi-Sil® 233, Hi-Sil® 243, FloGard® SP, FloGard® LP and the like, (PPG Industries), Ultrasil® VN2 and Ultrasil® VN3 (Degussa), Perkasil® KS 300-PD (Grace Davison), Zeosil® 1165MP (Rhone Poulenc) and others available from J.M. Huber Corporation, and the like. Most of these commercial silicas are available in pelletized, granulated and/or powdered form and, for purposes of the embodiments of the invention, the powdered silicas are most suitable. Powdered silicas that have been pre-surface treated with a silane are also commercially available and include, but are not limited to, Ciptane® 255 LD and Ciptane® LP (PPG Industries) that are powdered silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. Ciptane® I and Ciptane® TM are pelletized versions of the powdered pre-treated silicas above.

In one embodiment, the silica having the first average particle size is mixed with an organic solvent to form a slurry, as described above, and the silica slurry is passed through a grinding apparatus to form a ground silica slurry in which the average particle size of the silica has been reduced to about one to about 20 microns, suitably about one to about 10 microns, often about 6 microns. The ground silica slurry in the organic solvent can then be mixed with an elastomer, such as a diene elastomer and/or other elastomer described below. The elastomer can be a solution- or emulsion-polymerized elastomer, or a natural rubber that has simply been dissolved in an organic solvent, or the elastomer can be present as the polymer cement in an organic solvent after solution polymerization is completed and prior to desolventization. Grinding of the silica reduces the size of silica agglomerates in the slurry, resulting improved silica dispersion in the elastomer.

In another embodiment, the silica can be first mixed with a first organic solvent to form a silica slurry and the silica slurry then mixed with the elastomer in a second organic solvent that is the same as or different than the first organic solvent. Subsequently, the mixture of silica slurry and polymer is then passed through the grinding apparatus resulting in a reduced size of the silica agglomerates, and an improved, readily achieved uniformity of the dispersion of the silica in the polymer.

In yet another embodiment, the silica having the first average particle size can be directly added to the polymer cement in organic solution without having first formed a slurry. In this embodiment, the silica and polymer in the organic solvent can then be ground to form a well dispersed silica (having a reduced particle size) in the polymer. In each of the above embodiments, the weight percent of the ground silica in the resulting solution masterbatch ranges from about 10 phr to about 120 phr, and suitably about 20 phr to about 85 phr.

Many varieties of grinding apparatuses are known commercially. A suitable grinding apparatus will pulverize the silica agglomerates to an average particle size of not more than about 20 microns. That is, the first average particle size of the silica (prior to grinding) is typically about 20 to about 200 microns, about 30 to about 100 microns and, often, about 50 microns. After grinding, the average particle size will be reduced to about one to about 20 microns, about one to about 10 microns and, often, about 6 microns. For example, a single pass of the silica slurry described above through a media mill is expected suitably to reduce the average particle size of the silica agglomerate. However, depending upon the type of grinding apparatus employed, the number of passes of the silica through the apparatus is not limited to a single pass, but may require more than one pass.

The grinding apparatus is most suitably a wet-grind apparatus, wherein the silica and/or other ingredients are in an organic solvent. Grinding may be a batch-wise or continuous type and it is most suitable to use media mills that make use of grinding media. Evaluation of the media mill is routine in the art, and takes into account the composition, size and characteristics of the grinding bead, the energy required the volume of the mill chamber, the mass-specific energy required, the degree of packing of the mill, the residence time distribution, the flow rate through the mill, the agitator speed, the slurry concentration, the desired particle size, and the like. For the purposes of preparing the ground silica slurries having the desired concentrations and average particle sizes described above, a suitable media mill is the HML-1.5 Super Mill®, Premier Mill Corp., Reading, Pa. and, it has been found that a suitable average particle size of the silica agglomerate can be reduced by a single pass through the media mill. However, this example is not to be considered limiting, as there are other media mills commercially available that may be appropriate for other preparations according to the embodiments of the invention. For example, for commercial applications of the embodiments of the invention to be practiced, milling apparatuses that are much larger than the exemplary apparatus above are employed.

In each of the embodiments according to the invention, the silica in the silica slurry can be mixed with one or more additional fillers, and/or one or more additional polymers, and/or one or more surfactants, and/or one or more silica coupling agents, prior to desolventizing the solution masterbatch. In particular, in the embodiment in which the silica is ground in a silica slurry, the silica slurry can be mixed with additional fillers, and/or one or more additional polymers, and/or one or more surfactants, and/or one or more silica coupling agents, prior to the grinding step, and/or all the ingredients can be ground together in one pot. Alternatively, the silica slurry can be mixed individually with the one or more additional ingredients and ground, an additional one or more ingredient can then be added to the ground mixture, and the mixture reground, in all combinations of ingredients and number of grinding steps, without limitation, to form the solution masterbatch, prior to desolventization.

Additional fillers added to the silica slurry, before or after grinding, can be reinforcing fillers, non-reinforcing fillers, polymer microparticle fillers, polymer nanoparticle fillers, and mixtures thereof. Suitable additional reinforcing fillers include, but are not limited to, carbon black, silicates such as calcium silicate, aluminum silicate, magnesium silicate and the like, clay (hydrous aluminum silicate), talc (hydrous magnesium silicate), mica, and the like. Suitable non-reinforcing fillers including, but not limited to, titanium dioxide, urea, sodium sulfate, and the like, are known in the art of rubber compounding.

Carbon black is a particularly suitable reinforcing filler for use in the solution masterbatch. In particular, adding carbon black to the ground or unground silica slurry, and grinding the mixture, especially in the presence a polymer, greatly improves the dispersion of both the carbon black and the silica in the polymer. That is, a grinding step that includes carbon black can substantially reduce the size of the carbon black agglomerates as well as the silica aggregates, resulting in improved carbon black dispersion. The carbon black can be present in the solution masterbatch in amounts ranging from about one to about 50 phr, about five to about 35 phr, and the like. The carbon blacks can include any of the commonly available, commercially-produced carbon blacks. Such carbon blacks can have a surface area (EMSA) of at least 20 m$^2$/g and, suitably, at least 35 m$^2$/g up to 200 m$^2$/g or higher. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention can be in pelletized form or an unpelletized flocculent mass. Suitably, unpelletized carbon black provides a greater dispersion of the carbon black in the polymer when ground with the polymer and/or silica slurry. As discussed above, grinding of the carbon black with the silica and/or polymer in a slurry will also reduce the average particle size of the carbon black, as can be documented in optical micrographs and/or dispersion indices described above, and illustrated in the examples and figures below.

The preparation of suitable polymer microparticle fillers and polymer nanoparticle fillers is disclosed in U.S. Pat. No. 6,872,785, the entire disclosure of which is hereby incorporated by reference.

Surfactants that are soluble in organic solvents can be added to the silica slurry and/or silica slurry/polymer mixture, before or after grinding. Surfactants tend to stabilize the dispersion of the silica in the polymer. Suitable surfactants include, but are not limited to, polyethylene glycol type surfactants such as fatty acid-ethylene oxide adducts, polyhydric alcohol fatty acid ester-ethylene oxide adducts, polyether-modified silicones, polypropylene glycol-ethylene oxide adducts and the like. Examples of polyhydric alcohol type surfactants are fatty acid esters of glycerol, fatty acid esters of pentaerythritol, fatty acid esters of hydrogenated and non-hydrogenated $C_5$ and $C_6$ sugars (e.g., sorbose, mannose, and arabinose) including, but not limited to, the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maz® 80.

Polyoxyethylene derivatives of fatty acid esters of hydrogenated and non-hydrogenated $C_5$ and $C_6$ sugars are also useful surfactants and can include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate® 80, Tween® 80, Emsorb® 6900, Liposorb® O-20, T-Maz® 80, and the like. The Tween® products are commercially available from ICI Specialty Chemicals.

A useful amount of any of these surfactants is about 0.1% to about 25% by weight based on the weight of the silica, with about 0.5% to about 20% by weight being suitable, and about 1% to about 15% by weight based on the weight of the silica also suitable.

Other ingredients can include additives that are non-reactive with the polymer but act as silica/polymer stabilizing agents. Such additives are well known as silica shielding agents. In this regard, silanes such as alkyl alkoxysilanes are particulary suitable. However, other silica shielding agents can be used, without limitation.

Silica coupling agents can include, but are not limited to, bifunctional silica coupling agents having a moiety (e.g., an alkoxysilyl group) reactive with the silica surface, and a moiety (e.g., a mercapto, amino, vinyl, epoxy or sulfide group) that binds to the elastomer. Well known examples of such silica coupling agents are mercaptosilanes, bis(trialkoxysilylorgano) polysulfides, such as bis(3-triethoxysilylpropyl) tetrasulfide which is sold commercially as Si69 by Degussa, and 3-thiocyanatopropyl trimethoxysilane. These bifunctional silica coupling agents offer excellent coupling between rubber and silica, resulting in rubbers having improved wet ice skid resistance, rolling resistance and tread wear. Particularly suitable silica coupling agents for use in the embodiments of the invention are pre-reacted with the silica. For example, commercially available powdered silicas that have been pre-surface treated with a silane are suitable and include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. As described above, granulated and/or pelletized versions of these pre-treated silicas can also be employed if they are pre-crushed to the required average first particle size.

Organic solvents for use in preparing the silica-containing slurry and/or the silica-containing solution masterbatch can include, but are not limited to, hydrocarbon solvents comprised of one or more aromatic, paraffinic or cycloparaffinic compounds. These solvents will normally contain from about 4 to about 10 carbon atoms per molecule and will be liquid. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture. The solvent for the silica and the solvent for the elastomer may be the same or different from each other. However, it is preferred that the individual solvents are miscible with each other.

The present invention can be used in conjunction with any solution or emulsion polymerized elastomer. For example, any dried emulsion polymerized elastomer can be mixed in an organic solvent and be suitable for use in the embodiments of the invention.

Solution and emulsion polymerization techniques are well known to those of ordinary skill in the art. For example, conjugated diene monomers, monovinyl aromatic monomers, triene monomers, and the like, can be anionically polymerized to form conjugated diene polymers, or copolymers or terpolymers of conjugated diene monomers and monovinyl aromatic monomers (e.g., styrene, alpha methyl styrene and the like) and triene monomers. Thus, the elastomeric products can include diene homopolymers from monomer A and copolymers thereof with monovinyl aromatic monomers B. Exemplary diene homopolymers are those prepared from diolefin monomers having from about four to about 12 carbon atoms. Exemplary vinyl aromatic copolymers are those prepared from monomers having from about eight to about 20 carbon atoms. Copolymers can comprise from about 99 percent to about 50 percent by weight of diene units and from about one to about 50 percent by weight of monovinyl aromatic or triene units, totaling 100 percent. The polymers, copolymers and terpolymers of the present invention can have 1,2-microstructure contents ranging from about 10 percent to about 80 percent, with the some suitable polymers, copolymers or terpolymers having 1,2-microstructure content of from about 25 to 65 percent, based upon the diene content. The elastomeric copolymers are suitably random copolymers which result from simultaneous copolymerization of the monomers A and B with randomizing agents, as is known in the art.

Exemplary polymers for use in a solution masterbatch or in a mixture of a solution masterbatch and a dry mix vulcanizable elastomeric compound according to the invention include, but are not limited to, polyisoprene, polystyrene, polybutadiene, butadiene-isoprene copolymer, butadiene-isoprene-styrene terpolymer, isoprene-styrene copolymer, and styrene-butadiene copolymer.

Anionic polymerization initiators for use in polymerizing the anionically polymerizable monomers include, but are not limited to, organo-sodium, organo-potassium, organo-tin-lithium, organo-lithium, dialkylimido-lithium and cycloalky-limido-lithium initiators. As an example of such initiators, organo-lithium compounds useful in the polymerization of 1,3-diene monomers are hydrocarbyl lithium compounds having the formula RLi, where R represents a hydrocarbyl group containing from one to about 20 carbon atoms and, suitably, from about 2 to about 8 carbon atoms. Although the hydrocarbyl group is preferably an aliphatic group, the hydrocarbyl group can also be cycloaliphatic or aromatic. The aliphatic group can be a primary, secondary, or tertiary group, although the primary and secondary groups are most suitable. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octadecyl. The aliphatic group can contain some unsaturation, such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organo-lithium compounds which are useful as anionic initiators in the polymerization of the monomers listed above, especially conjugated dienes include, but are not limited to, n-butyl lithium, n-propyl lithium, iso-butyl lithium, tert-butyl lithium, tributyl tin lithium (described in co-owned U.S. Pat. No. 5,268,439), amyl-lithium, cyclohexyl lithium, and the like. Other suitable organo-lithium compounds for use as anionic initiators are well known to those skilled in the art. A mixture of different lithium initiator compounds also can be employed. Typical and suitable organo-lithium initiators are n-butyl lithium, tributyl tin lithium and "in situ" produced lithium hexamethyleneimide initiator prepared by reacting hexamethyleneimine and n-butyl lithium (described in co-owned U.S. Pat. No. 5,496,940).

The amount of initiator required to effect the desired polymerization can be varied over a wide range depending upon a number of factors, such as the desired polymer molecular weight, the desired 1,2- and 1,4-content of the polydiene, and the desired physical properties for the polymer produced. In general, the amount of initiator utilized can vary from as little as 0.2 millimoles (mM) of lithium per 100 grams of monomers up to about 100 mM of lithium per 100 grams of monomers, depending upon the desired polymer molecular weight.

Polymerization is usually conducted in a conventional solvent for anionic polymerizations, such as hexane, cyclohexane, benzene and the like. As discussed above, the polymerization solvent can be the same or different from the solvent used to prepare a silica slurry. Various techniques for polymerization, such as semi-batch and continuous polymerization can be employed.

In order to promote randomization in co-polymerization and to increase vinyl content, a polar coordinator can optionally be added to the polymerization ingredients. Amounts range between about one to about 90 or more equivalents per equivalent of lithium. The amount depends upon the type of polar coordinator that is employed, the amount of vinyl desired, the level of styrene employed and the temperature of the polymerizations, as well as the selected initiator. Compounds useful as polar coordinators are organic and include tetrahydrofuran, linear and cyclic oligomeric oxolanyl alkanes such as 2-2-di(tetrahydrofuryl) propane, dipiperidyl ethane, hexamethyl phosphoramide, N-N-dimethyl piperazine, diazabicyclo octane, dimethyl ether, diethyl ether, tributyl amine and the like. The linear and cyclic oligomeric oxolanyl alkane polar coordinators are described in U.S. Pat. No. 4,429,091, the subject matter of which regarding polar coordinators is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; and tertiary amines, such as tetramethylethylene diamine (TMEDA).

Polymerization is begun by charging a blend of the monomer(s) and solvent to a suitable reaction vessel, followed by the addition of the polar coordinator and the initiator previously described. The procedure is carried out under anhydrous, anaerobic conditions. Often, it is conducted under a dry, inert gas atmosphere. The polymerization can be carried out at any convenient temperature, such as about 0° C. to about 150° C. For batch polymerizations, it is suitable to maintain the peak temperature at from about 50° C. to about 150° C. and, also suitably, from about 60° C. to about 100° C. Polymerization is allowed to continue under agitation for about 0.15 hours to 24 hours. After polymerization is complete, the product is terminated by a quenching agent, an endcapping agent and/or a coupling agent, as described herein below. The terminating agent is added to the reaction vessel, and the vessel is agitated for about 0.1 hours to about 4.0 hours. Quenching is usually conducted by stirring the polymer and quenching agent for about 0.01 hours to about 1.0 hour at temperatures of from about 20° C. to about 120° C. to ensure a complete reaction. Polymers terminated with an alkoxysilane functional group, as discussed herein below, are subsequently treated with alcohol or other quenching agent.

One way to terminate the polymerization reaction is to employ a protic quenching agent to give a monofunctional polymer chain. Quenching can be conducted in water, steam or an alcohol such as isopropanol, or any other suitable method. Quenching can also be conducted with a functional terminating agent, resulting in a difunctional polymer. Any compounds providing terminal functionality (i.e., endcapping) that are reactive with the polymer bound carbon-lithium moiety can be selected to provide a desired functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidinones, tin tetrachloride, tributyl tin chloride, carbon dioxide, and mixtures thereof. Further examples of reactive compounds include the terminators described in co-owned U.S. Pat. Nos. 5,521,309 and 5,066,729, the subject matter of which, pertaining to terminating agents and terminating reactions, is hereby incorporated by reference. Other useful terminating agents can include those of the structural formula $(R)_a ZX_b$, where Z is tin or silicon. Z is most suitably tin. R is an alkyl having from about 1 to about 20 carbon atoms; a cycloalkyl having from about 3 to about 20 carbon atoms; an aryl having from about 6 to about 20 carbon atoms, or an aralkyl having from about 7 to about 20 carbon atoms. For example, R can include methyl, ethyl, n-butyl, neophyl, phenyl, cyclohexyl or the like. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichloride, butyl silicon trichloride, as well as tetraethoxysilane (TEOS), $Si(OEt)_4$, and methyl triphenoxysilane, $MeSi(OPh)_3$. The practice of the present invention is not limited solely to these terminators, since other compounds that are reactive with the polymer bound carbon-lithium moiety can be selected to provide a desired functional group.

While terminating to provide a functional group on the terminal end of the polymer is desirable, it is further desirable to terminate by a coupling reaction with, for example, tin tetrachloride or other coupling agent such as silicon tetrachloride or esters. High levels of tin coupling are desirable in order to maintain good processability in the subsequent manufacturing of rubber products. It is preferred that the polymers for use in the vulcanizable elastomeric compositions according to the present invention have at least about 25 percent tin coupling. That is, about 25 percent of the polymer mass after coupling is of higher molecular weight than the polymer before coupling as measured, for example, by gel permeation chromatography. Suitably, before coupling, the polydispersity (the ratio of the weight average molecular weight to the number average molecular weight) of polymers, which can be controlled over a wide range, is from about one to about 5, one to about 2 and, also suitably, one to about 1.5.

As noted above, various techniques known in the art for carrying out polymerizations can be used to produce elastomers polymers suitable for use in the vulcanizable elastomeric compositions, without departing from the scope of the present invention.

Subsequent to polymerization of the elastomer, while it is still in the organic solvent, the elastomer can be mixed with the ground silica slurry. Alternatively, the silica having the first average particle size can be mixed with the elastomer, followed by grinding of the elastomer/silica mixture. Alternatively, the ground or unground silica slurry can be mixed with any or all of the ingredients described above, and ground (or reground) prior to mixing with the elastomer. Alternatively, multiple fillers and/or multiple elastomers can be mixed together and ground together in one pot. The "alternative" mixtures, however, are meant to be descriptive and not limiting, for as many ingredients can be mixed with the silica and/or elastomer(s) to form a solution masterbatch, in any combination whatsoever, with as many grinding steps and order of mixing of grinding, as desired, without limitation.

The final step of the preparation of the solution masterbatch is desolventization of the mixture. Desolventization may be accomplished by any known method including, but not limited to, drum drying, extruder drying, vacuum drying, spray drying, and the like, and steam desolventization. If steam desolventization is used, oven drying can be desirable.

The conjugated diene polymers, or copolymers or terpolymers of conjugated diene monomers and monovinyl aromatic monomers, can be utilized as 100 parts of the rubber in the treadstock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber and the like. When the vulcanizable elastomeric composition of the present invention is blended with conventional rubbers, the amounts can vary widely with a lower limit comprising about ten percent to 20 percent by weight of the total rubber. The minimum amount will depend primarily upon the physical properties desired.

Vulcanized elastomeric compounds according to the invention will have improved silica dispersion and can comprise (a) a desolventized solution masterbatch comprising a diene elastomer and a ground silica having an average particle size of about one to about 20 microns dispersed therein, wherein the weight percent of the ground silica in the solution masterbatch ranges from about 10 phr to about 120 phr; (b) optionally an additional elastomer, wherein the total amount of the diene elastomer in the solution masterbatch plus the optional additional elastomer is 100 parts; (c) optionally an additional reinforcing filler, selected from the group consisting of precipitated silica, carbon black, clay, polymer microparticles, polymer nanoparticles, and combinations thereof; (d) optionally about 2 to about 15 percent by weight, based on the total weight of the silica, of a silica coupling agent; (e) optionally a process oil; and (f) a cure agent. The resulting compound will demonstrate a low Mooney viscosity and excellent processing characteristics, allowing for the reduced use of processing aids such as oil. The compound also will demonstrate an increase in bound rubber, reduced filler flocculation after compounding, and improved hysteresis properties, compared with compounds that are prepared by dry mixing of the ingredients.

It is readily understood by those having skill in the art that the rubber compound would be compounded by methods generally known in the rubber compounding art, such as mixing the solution masterbatch with various additional vulcanizable polymer(s), various additional reinforcing fillers, and various commonly used additive materials such as, for example, curing agents, activators, retarders and accelerators, processing additives, such as oils, resins, including tackifying resins, plasticizers, pigments, non-reinforcing fillers, fatty acid, zinc oxide, waxes, antioxidants, anti-ozonants, peptizing agents, and the like. As known to those skilled in the art, depending on the intended use of the sulfur vulcanizable and sulfur vulcanized material (rubbers), the additives mentioned above are selected and commonly used in conventional amounts, in addition to other conventional rubber additives including, for example, other fillers, plasticizers, antioxidants, cure agents and the like, using standard rubber mixing equipment and procedures.

Such elastomeric compositions, when vulcanized using conventional rubber vulcanization conditions, exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

Typical amounts of tackifier resins, if used, comprise about 0.5 to about 10 phr, usually about one to about 5 phr. Typical amounts of compounding aids comprise about one to about 50 phr. Such compounding aids can include, for example, aromatic, naphthenic, and/or paraffinic processing oils. Typical amounts of antioxidants comprise about 0.1 to about 5 phr. Suitable antioxidants, such as diphenyl-p-phenylenediamine, are known to those skilled in the art. Typical amounts of anti-ozonants comprise about 0.1 to about 5 phr.

Typical amounts of fatty acids, if used, which can include stearic acid, palmitic acid, linoleic acid or a mixture of one or more fatty acids, can comprise about 0.5 to about 3 phr. Typical amounts of zinc oxide comprise about one to about 5 phr. Typical amounts of waxes comprise about one to about 2 phr. Often microcrystalline waxes are used. Typical amounts of peptizers, if used, comprise about 0.1 to about 1 phr. Typical peptizers can be, for example, pentachlorothiophenol and dibenzamidodiphenyl disulfide.

The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination.

The vulcanization is conducted in the presence of a sulfur vulcanizing agent. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Desirably, the sulfur vulcanizing agent is soluble sulfur or a mixture of soluble and insoluble polymeric sulfur. The sulfur vulcanizing agents are used in an amount ranging from about 0.1 to about 10 phr, desirably about 1.5 to about 7.5 phr, with a range of about 1.5 to about 5 phr being most desirable.

Accelerators are used to control the time and/or temperature required for vulcanization and to improve properties of the vulcanizate. The vulcanization accelerators used in the present invention are not particularly limited. Examples include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenylguanidine (DPG) and the like. The amount of the vulcanization accelerator used is about 0.1 to about 5 phr and, also suitably, about 0.2 to about 3 phr.

Pneumatic tires having an improved tensile mechanical and dynamic viscoelastic properties, and comprising at least one component produced from the sulfur-vulcanized elastomeric compound of the invention, according to the embodiments of the invention will exhibit will have improved wear resistance, rolling resistance, excellent wet traction and superior handling.

EXAMPLES

The following examples illustrate methods of preparation of representative solution masterbatch compounds (SMBs) containing polymer(s), silica, and/or other ingredients, including other fillers. Further illustrated are methods for preparation of organic dispersions/slurries of ground silica and the use of such ground silica slurries in SMBs. Further provided are rubber compounds containing such SMBs. The examples are not intended to be limiting, as other organic dispersions of ground silicas and SMBs can be prepared according to the described methods. Furthermore, polymers other than those illustrated can be employed. All the methods are exemplary only and other methods for preparing the ground silica slurries, SMBs and other rubber compounds, including different compounding formulations, can be determined by those skilled in the art without departing from the scope of the invention herein disclosed and claimed.

Physical Testing of Rubber Compounds

In the examples below, the green stocks (i.e., the stocks obtained after the final mixing stage, prior to curing) were characterized as to Mooney viscosity and cure characteristics. The Mooney viscosity measurement was conducted at 130° C. using a large rotor, and was recorded as the torque when rotor had rotated for 4 minutes. The stocks were preheated at 130° C. for 1 minute before the rotor was started. The $t_5$ is the time required for the viscosity to increase by five Mooney units during a Mooney scorch measurement. It is used as an index to predict how fast the compound viscosity will increase during processing (e.g., during extrusion).

A Monsanto Rheometer MD2000 was used to characterize the stock curing process, at a frequency of 100 cycles per minute, and a strain of 7% at 171° C. The measurements $t_{S2}$ and $t_{90}$ are the times taken for an increase in torque of 2% and 90%, respectively, of the total torque increase during the cure characterization test. These values are useful in predicting the speed of the viscosity increase ($t_{S2}$) and the cure rate during the cure process ($t_{90}$).

The degree of stabilization of the filler morphology during storage and curing of the compounds was measured by the filler flocculation. The "final" compounds (without curatives) were sheeted and subsequently annealed at 171° C. for 15 minutes to simulate the heat history normally encountered during vulcanization. The filler flocculation is defined as the difference of compound modulus G' after and before the annealing: $\delta G' = G'_{after\ annealing} - G'_{before\ annealing}$.

The Payne effect measurement ($\Delta G'$) and the tan δ at 7% strain were obtained from strain sweep tests of the cured stocks conducted at 65° C. at a frequency of 3.14 radians/second, and a strain sweeping from 0.25% to 14.75%. In some of the tables below, where indicated, the $\Delta G'$ and the tan δ at 5% strain were obtained from strain sweep tests of the cured stocks, conducted at 60° C. at a frequency of 31.4 radians/second, and a strain sweeping from 0.25% to 14.75%.

The dynamic viscoelastic properties of the cured stocks were measured by temperature sweep tests. The measured viscoelastic properties were the storage modulus (G' @ −20° C.,) tan δ @ 50° C. and tan δ at 50° C. Temperature sweep tests were conducted at a frequency of 31.4 radians/second using 0.5% strain for the temperatures ranging from −100° C. to −10° C. and 2% strain for the temperatures ranging from −10° C. to +100° C. The strain and temperature sweep tests employed a Rubber Process Analyzer (Alpha Technologies, Inc.)

The ring tensile properties for the cured stocks were measured using the standard procedure described in ASTM-D 412 at 25° C. The tensile test specimens were round rings with a diameter of 0.05 inches and a thickness of 0.075 inches. A gauge length of 1.0 inches was used for the tensile test. The measurements were of mechanical strength (Tb and toughness) and elongation at break (Eb).

The micro dumbell tensile properties were measured using the standard procedure described in ASTM-D412 at 25° C. and/or 100° C., with a micro dumbell having a thickness of 0.075 inches.

The ring tear test was conducted according to ASTM-624-B at 171° C. or 100° C., using a nick die having an inside diameter of 44.0 mm+/−0.2 mm, an outside diameter of 57.5 mm+/−0.2 mm and a thickness of 0.100 inches.

Example 1

Media Mill Grinding of Silica 14 lbs. of hexane were discharged into a 5-gallon stirring reactor, followed by 750 grams of powdered silica (Flo-gard® SP, PPG Industries) and 36 grams of sorbitan monooleate (SMO). The mean particle size of the Flo-gard® SP was 40-50 microns, as measured by a particle analyzer (Saturn DigiSizer™ 5200 high definition particle size analyzer, Micromeritics, Norcross Ga.), using ultrasound to break down weak aggregates. After stirring at room temperature for 30 minutes, the resulting silica slurry was passed through a media mill (HML-1.5 Super Mill®, Premier Mill Corp., Reading, Pa.) and collected in several one-gallon jars. The media mill had a capacity of 1.5 L, with an operational volume of 1.36 L, and was 75% loaded with the media, zirconium oxide (ZrO) ceramic beads with a diameter of 0.7-1.2 mm. The media mill had five nylon disks that were rotated at a speed of 2400 rpm.

After one pass through the media mill, the mean particle size of the ground silica in the slurry was about 6 microns. An illustration of the process is shown in FIG. 1.

The solids content of ground silica in the slurry was about 10% by weight, measured by weighing a sample of the ground slurry before and after drying.

Example 2

Figure 2:
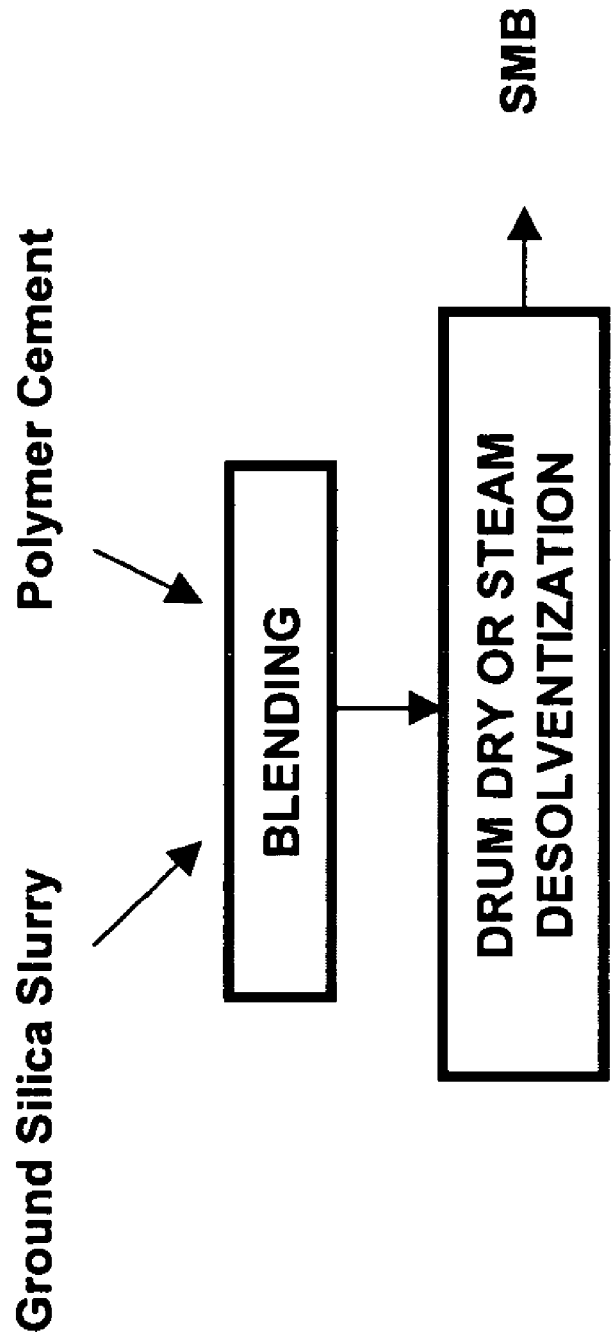
FIG. 2 illustrates the method step of mixing the ground silica slurry with a solution polymerized elastomer in an organic solvent, prior to desolventization, to form a solution masterbatch (SMB).

Preparation of Solution MasterBatch (SMB-1) Using Functionalized Solution SBR Polymer Cement and Ground Silica Slurry 1000 grams of tetraethoxysilane (TEOS)-terminated solution SBR polymer cement in hexane (20% styrene, 56.4% vinyl, $T_g$=−34.8° C., $ML_4$=33.4) was mixed with 900 grams of the media mill-ground silica slurry from Example 1 in a one-gallon jar. The mixture was then transferred to a Waring blender and blended about one minute at high speed. The solution blend of polymer cement and ground silica slurry was then drum dried (SMB-1). An illustration of the process is shown in FIG. 2.

Example 3

Compounding of SMB-1 in All-Silica Formulation 270 grams of the dried SMB-1 from Example 2 was mixed with 18 grams of aromatic oil and the other additives shown in Table 1 in a 300 gram Brabender mixer. A silica coupling agent, Si69, in an amount of 10% by weight based on the silica, was added during the remill, and the curatives were added in the final mixing stage.

Two comparison stocks, containing the polymer, silica and other additives described in Table 1, were dry-mixed similarly for comparison. Comparison (C-1) was mixed without the addition of SMO. The second comparison (C-2) stock was mixed with the addition of the same amount of SMO contained in the SMB-1 stock. The mixing conditions, processing characteristics and compound properties are summarized in Table 2.

Thermogravimetric Analysis (TGA) showed that all three stocks had the same actual dry silica loading of 47 phr. The 50 phr indicated in Table 1 was the amount used after the silica had naturally absorbed water. The total mixing times (minutes) of the C-1, C-2 and SMB-1 stocks (10.5, 10.9 and 11.6, respectively) and total mixing energies (W-hr) of the C-1, C-2 and SMB-1 stocks (155, 148 and 157, respectively) were similar. The green SMB-1 stock had a lower compound Mooney viscosity ($ML_{1+4}$) than both of the comparison stocks C-1 and C-2. All stocks were then cured at 171° C. for 15 minutes.

TABLE 1

| INGREDIENT | AMOUNT (phr) |
|---|---|
| Polymer | 100 |
| Silica | 50 |
| Aromatic Oil | 10 |
| Stearic Acid | 2 |
| Wax | 1 |
| Sorbitan Monooleate | Variable |

TABLE 1-continued

| INGREDIENT | AMOUNT (phr) |
|---|---|
| Remill | |
| Si69 | 5 |
| Final Stage | |
| Zinc Oxide | 3 |
| DPG [1] | 0.5 |
| MBTS [2] | 1 |
| TBBS [3] | 1 |
| Sulfur | 1.15 |

[1] Diphenylguanidine
[2] Dibenzothiazole disulfide
[3] N-tert-2-Benzothiazole Sulfenamide The cured SMB-1 stock had reduced hysteresis (lower tan δ at 50° C.) than both comparison stocks. In addition, the cured SMB-1 stock showed improved wear, as indicated by the Lambourn Wear Indices. The cured SMB-1 stock also showed improved silica dispersion, as indicated by the marked decrease in the Payne effect (ΔG') and the significant improvement in the dispersion index. All improvements in the SMB-1 stock were achieved while retaining comparable tensile properties to the comparison stocks.

TABLE 2

| Ingredient/Property | Comparison C-1 (dry mix) | Comparison C-2 (dry mix) | SMB-1 |
|---|---|---|---|
| Silica | 47 phr | 47 phr | (47 phr) |
| Sorbitan Monooleate | 0 phr | 2.7 phr | (2.7 phr) |
| Rheometer Curve | | | |
| MH (lb-in) | 21.7 | 20.4 | 18.3 |
| ML (lb-in) | 3.8 | 3.2 | 3.1 |
| $t_{90}/t_{s2}$ (min.) | 10.6/2.9 | 10.7/3.2 | 10.4/3.2 |
| Mooney viscosity, $ML_{1+4}$ | 88 | 81 | 78 |
| Dynastat | | | |
| tan δ, 0° C. | 0.159 | 0.157 | 0.148 |
| tan δ, 23° C. | 0.106 | 0.107 | 0.098 |
| tan δ, 50° C. | 0.085 | 0.087 | 0.075 |
| Strain Sweep | | | |
| tan δ (7% strain), 65° C. | 0.083 | 0.084 | 0.074 |
| ΔG', 65° C. (MPa) | 0.837 | 0.775 | 0.490 |
| Temp. Sweep | | | |
| Tg of stock, ° C. | −29.2 | −29.5 | −29.4 |
| Wet Stanley-London | 77 | 77 | 77 |
| Lambourn Wear Index | | | |
| 25% slip | 100 | 112 | 118 |
| 65% slip | 100 | 102 | 109 |
| Lambourn Laminate Wear Index | | | |
| 25% slip | 100 | 107 | 122 |
| 65% slip | 100 | 103 | 109 |
| Dispersion Index (Surf Analyzer) | 35 | 32 | 88 |
| Micro Dumbell Tensile | | | |
| 50% Modulus (MPa), 23° C. | 1.4 | 1.3 | 1.2 |
| 300% Modulus (MPa), 23° C. | 7.1 | 6.2 | 6.6 |
| Tensile at break (MPa), 23° C. | 27.0 | 26.6 | 23.7 |
| Elong. at break (%), 23° C. | 795 | 875 | 733 |
| 50% Modulus (MPa), 100° C. | 1.4 | 1.3 | 1.3 |
| Tensile at break (MPa), 100° C. | 10.3 | 8.5 | 9.6 |
| Elong. at break, 100° C. | 433 | 403 | 407 |
| Toughness (MPa), 100° C. | 21 | 17 | 18 |
| Ring Tensile | | | |
| 50% Modulus (MPa), 23° C. | 1.2 | 1.1 | 1.0 |
| 300% Modulus (MPa), 23° C. | 8.9 | 7.5 | 8.3 |
| Elong. at break (%), 23° C. | 502 | 559 | 568 |
| Toughness (MPa), 23° C. | 41 | 45 | 54 |
| 50% Modulus (MPa), 100° C. | 0.9 | 0.9 | 0.8 |
| 300% Modulus (MPa), 100° C. | 7.1 | 6.5 | 7.1 |
| Elong. at break, 100° C. | 386 | 365 | 343 |
| Toughness (MPa), 100° C. | 16 | 13 | 12 |

Example 4

Compounding of SMB-2—High Oil, High Filler (Silica & Carbon Black) Formulation 1000 grams of 18 wt % TEOS-terminated SSBR polymer cement prepared as in Example 2 was mixed and blended with 1350 grams of 10% by weight of media mill-ground silica slurry, and drum dried as in Example 2. The resulting SMB-2 had a high silica loading (75 phr). The SMB-2 was then dry-mixed in a 300 gram Brabender mixer with 16 phr carbon black and 42.5 phr of oil, and other ingredients as illustrated in Table 3. The silica coupling agent was a disulfane, Si75 (Degussa) added in the remill in an amount of 8% by weight of the silica. A comparison stock (C-3) for comparison was a dry mix of an equivalent amount of the polymer, silica, carbon black, oil and the other additives.

TABLE 3

| INGREDIENT | AMOUNT (phr) |
|---|---|
| Polymer | 100 |
| Silica | 75 |
| Carbon Black | 16 |
| Aromatic Oil | 42.5 |
| Stearic Acid | 2 |
| Wax | 2 |
| Antioxidant[1] | 0.3 |
| Antioxidant[2] | 1.5 |
| Sorbitan Monooleate | Variable |
| Remill | |
| Si75[3] | 6 |
| Final Stage | |
| Zinc Oxide | 6.5 |
| DPG | 1.2 |
| MBTS | 2 |
| CBS[4] | 0.65 |
| Sulfur | 1.85 |

[1] 2,2,4-trimethyl-1,2-dihydroquinoline (TMQ)
[2] N-(1,3-dimethylbutyl)-N'-fenyl-p-fenylenediamine (Santoflex 13, Flexys)
[3] Degussa
[4] N-cyclohexyl-2-benzothiazole sulfenamide The processing and compound properties of the SMB-2 and C-3 stock are summarized in Table 4. The mixing energy was 107.3 W-hr for the C-3 comparison stock and 106.2 W-hr for the SMB-2 compound.

TABLE 4

|  | Comparison C-3 | SMB-2 |
|---|---|---|
| Rheometer Curve | | |
| MH (lb-in) | 22.20 | 19.36 |
| ML (lb-in) | 3.79 | 3.06 |
| $t_{90}$ (min.) | 14.20 | 11.11 |
| Mooney viscosity, $ML_{1+4}$ | 44.7 | 41.2 |
| Bound rubber (%) | 21.8 | 55.8 |
| Wet Stanley London | 69.0 | 70.0 |
| Lambourn Wear Index | | |
| 25% slip | 100 | 115 |
| 65% slip | 100 | 102 |
| Pendulum Rebound | | |
| 23° C. | 32.0 | 34.4 |
| 65° C. | 47.0 | 51.6 |
| Dynastat | | |
| tan δ, 23° C. | 0.217 | 0.234 |
| tan δ, 50° C. | 0.187 | 0.178 |
| Micro Dumbell Tensile | | |
| 100% Modulus (MPa), 23° C. | 2.59 | 2.12 |
| 300% Modulus (MPa), 23° C. | 8.08 | 7.22 |
| TB (MPa), 23° C. | 18.56 | 20.38 |
| Elong. at break (%), 23° C. | 604 | 650 |
| Toughness (MPa), 23° C. | 52.70 | 58.09 |
| 100% Modulus (MPa), 100° C. | 2.47 | 2.06 |
| 300% Modulus (MPa), 100° C. | 6.99 | 6.22 |
| TB (Mpa), 100° C. | 9.48 | 9.75 |
| Elong. at break, 100° C. | 397 | 432 |
| Toughness (MPa), 100° C. | 18.79 | 19.79 |
| Ring Tear | | |
| Tear Strength (KN/m) | 17.76 | 19.10 |
| Travel at tear (%) | 301 | 375 |

As illustrated in Table 4, the compound Mooney viscosity was reduced from 44.7 (C-3) to 41.2 (SMB-2), while the bound rubber was increased from 21.8% (C-3) to 55.8% (SMB-2), showing the clear advantage of the use of the SMB-2 over the dry-mixed comparison C-3. Further, the properties of the cured compounds further show the superiority of the SMB-2 rubber stock over the comparison stock C-3. In particular, the Lambourn wear index was increased by about 15% in the SMB-2 stock. The hysteresis of the SMB-2 was reduced, as shown by the increase in rebound at 50° C. from 47 (C-3) to 51.6 and the reduction in the tan δ at 50° C. from 0.187 (C-3) to 0.178. The wet traction of the SMB-2 stock was comparable or slightly improved over C-3, as shown by the Wet Stanley London increase from 69 (C-3) to 70 (SMB-2) and the increase in tan δ at room temperature from 0.217 (C-3) to 0.234 (SMB-2). The tensile properties of the SMB-2 stock were also improved, compared to the C-3 stock.

Example 5

Compounding of SMB-3—High Oil, High Filler (Silica & Carbon Black) Using Non-Functionalized Polymer The compounding preparation described in Example 4 was used, except that the SSBR polymer was not functionalized with TEOS; rather it was a non-functionalized polymer (19.7% styrene, 58.7% vinyl, $T_g$=32.76) where the polymerization was terminated with isopropanol. The preparation of the solution masterbatch of polymer and ground silica was the same as the method used in Example 4, using the same ratios of polymer, silica and oil, and the resulting preparation is termed SMB-3. The dry mixing procedures and formulation of the compounding mixtures for SMB-3 and the comparison C-4 were also the same as that used in Example 4.

The compound properties illustrated in Table 5, such as wear, hysteresis, tensile properties and wet Stanley London, are improved in the SMB-3 stock, compared with the dry mixed comparison C-4. In the cured stock, the Lambourn wear index was improved in the SMB-3 stock. Further, the tan δ at 50° C. was reduced and the tan δ at 23° C. was increased, indicating reduced hysteresis in the SMB-3 stock. These results, using a non-functionalized SSBR, were similar to those obtained using a SSBR that was functionalized with TEOS. Therefore, the improved results were not limited to polymers having functional groups, but were due to the process using a solution masterbatch.

TABLE 5

|  | Comparison C-4 | SMB-3 |
|---|---|---|
| Rheometer Curve | | |
| MH (lb-in) | 21.31 | 20.95 |
| ML (lb-in) | 2.65 | 2.69 |
| $t_{90}$ (min.) | 12.37 | 11.89 |
| Bound rubber (%) | 13.5 | 22.5 |
| Wet Stanley London | 68.0 | 73.0 |
| Lambourn Wear Index | | |
| 25% slip | 100 | 107 |
| 65% slip | 100 | 101 |
| Dynastat | | |
| tan δ, 23° C. | 0.217 | 0.234 |
| tan δ, 50° C. | 0.187 | 0.178 |
| Micro Dumbell Tensile | | |
| 100% Modulus (MPa), 23° C. | 2.63 | 2.53 |
| 300% Modulus (MPa), 23° C. | 8.04 | 7.95 |
| Elong. at break (%), 23° C. | 626 | 652 |
| Toughness (MPa), 23° C. | 55.42 | 59.94 |
| 100% Modulus (MPa), 100° C. | 2.34 | 2.32 |
| 300% Modulus (MPa), 100° C. | 6.60 | 6.50 |
| Elong. at break, 100° C. | 439 | 461 |
| Toughness (MPa), 100° C. | 21.63 | 23.87 |
| Ring Tear (171° C.) | | |
| Tear Strength (KN/m) | 16.28 | 19.95 |
| Travel at tear (%) | 297 | 357 |

Example 6

Media Mill Grinding of Multiple Fillers and Preparation of SMB-4

Figure 3:
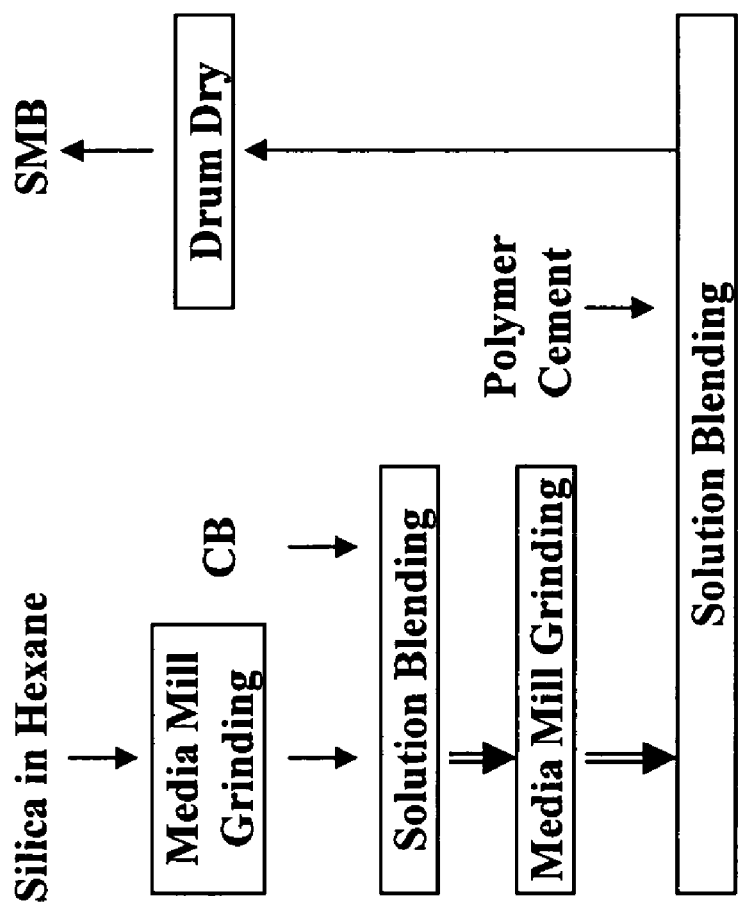
FIG. 3 illustrates blending of the ground silica slurry with other fillers, such as carbon black (CB), followed by another grinding step to reduce the size of the carbon black aggregates, prior to blending the ground fillers with the polymer cement (in organic solvent) and ultimate desolventization.

96 grams of carbon black were mixed with 4500 grams of 10 wt % of ground silica slurry (prepared in Example 1) in a Waring blender and then ground together in one pass through the media mill. The ground filler mixture was then blended with 3333 grams of 18 wt % of TEOS-terminated SSBR polymer cement in hexane. The mixture was then drum dried. The process of preparing the resulting SMB-4 is illustrated in FIG. 3. The SMB-4 contained 75 phr silica and 16 phr carbon black.

Example 7

Compounding of SMB-4—High Oil, High Filler (Silica & Carbon Black) Formulation The SMB-4 prepared in Example 6 (75 phr silica, 16 phr carbon black) was mixed in a 300 gram Brabender mixer with 42.5 phr of oil, a disilane silica coupling agent (Si75, Degussa), and the other additives listed in Table 1.

A total of six stocks were dry-mixed (CB/Si/oil): the SMB-4-stock (16/75/42.5); the SMB-4 stock plus 4 phr of carbon black (SMB+CB, 20/75/42.5); the SMB-4 stock plus 4 phr of carbon black and 10 phr of silica (SMB+Si/CB, 20/85/42.5); the SMB-4 stock containing a reduced amount of oil (SMB-oil, 16/75/30); a comparison stock (C-5, dry mix, 16/75/42.5); and a second comparison stock (C-6, dry mix, 20/85/42.5).

The processing characteristics and properties of the six cured compounds are summarized in Table 6. Although the dry mix comparison stock (C-5) had the same formulation as SMB-4, the compound Mooney viscosity of SMB-4 (32.4) is much lower than C-5 (40), showing the advantages in processability gained by the use of the SMB prepared stocks. The advantage of using SMB stocks is also indicated in compound properties, such as wet traction (Stanley London and tan δ at 23° C.) and hysteresis (rebound at 50° C., and tan δ at 60° C., see also the strain sweep results shown in FIG. 5).

TABLE 6

| | C-5 | SMB-4 | C-6 | SMB-oil | SMB + CB | SMB + Si/CB |
|---|---|---|---|---|---|---|
| | | | Formulation | | | |
| | 16/75/42.5 | 16/75/42.5 | 20/85/42.5 | 16/75/30 | 20/75/42.5 | 20/85/42.5 |
| Rheometer | | | | | | |
| MH (lb-in) | 27.74 | 25.60 | 28.67 | 31.21 | 25.35 | 27.46 |
| ML (lb-in) | 5.57 | 3.97 | 5.65 | 5.56 | 4.24 | 4.59 |
| $t_{90}$ (min.) | 24.15 | 23.92 | 24.69 | 24.21 | 23.41 | 23.04 |
| $ML_{1+4}$ | 40.0 | 32.4 | 45.8 | 44.7 | 35.4 | 42.0 |
| Hardness (23° C.) Peak/Terminal | 69.4/65.2 | 67.5/62 | 75.8/70.1 | 75.2/71.2 | 70.7/67 | 76.2/71.9 |
| Wet Stanley London Pendulum | 66.0 | 67.0 | 67.0 | 66.0 | 67.0 | 67.0 |
| Rebound | | | | | | |
| 23° C. | 31.2 | 32.2 | 29.2 | 32.4 | 31.2 | 30.2 |
| 50° C. | 45.6 | 47.2 | 43.4 | 48.8 | 45.4 | 43.6 |
| Dynastat | | | | | | |
| tan δ, 23° C. | 0.164 | 0.199 | 0.159 | 0.168 | 0.198 | 0.167 |
| tan δ, 50° C. | 0.161 | 0.167 | 0.171 | 0.148 | 0.179 | 0.163 |
| Strain Sweep | | | | | | |
| tan δ, 60° C. | 0.264 | 0.258 | 0.302 | 0.261 | 0.280 | 0.288 |
| ΔG', 60° C. (MPa) | 5.74 | 4.64 | 7.44 | 6.04 | 4.97 | 6.92 |
| Micro Dumbell Tensile | | | | | | |
| 100% Modulus (MPa), 23° C. | 3.25 | 3.25 | 3.79 | 4.37 | 3.41 | 3.89 |
| TB (MPa) | 17.60 | 15.17 | 16.55 | 17.17 | 16.19 | 15.83 |
| Elong. at break (%), 23° C. | 555 | 471 | 472 | 406 | 500 | 432 |
| Toughness (MPa), 23° C. | 47.40 | 35.56 | 38.75 | 34.82 | 40.34 | 34.39 |
| Ring Tear (171° C.) | | | | | | |
| Tear Strength (KN/m) | 5.32 | 3.70 | 4.14 | 3.41 | 3.33 | 2.46 |
| Travel at tear (%) | 62 | 52 | 46 | 44 | 48 | 43 |

Figure 4:
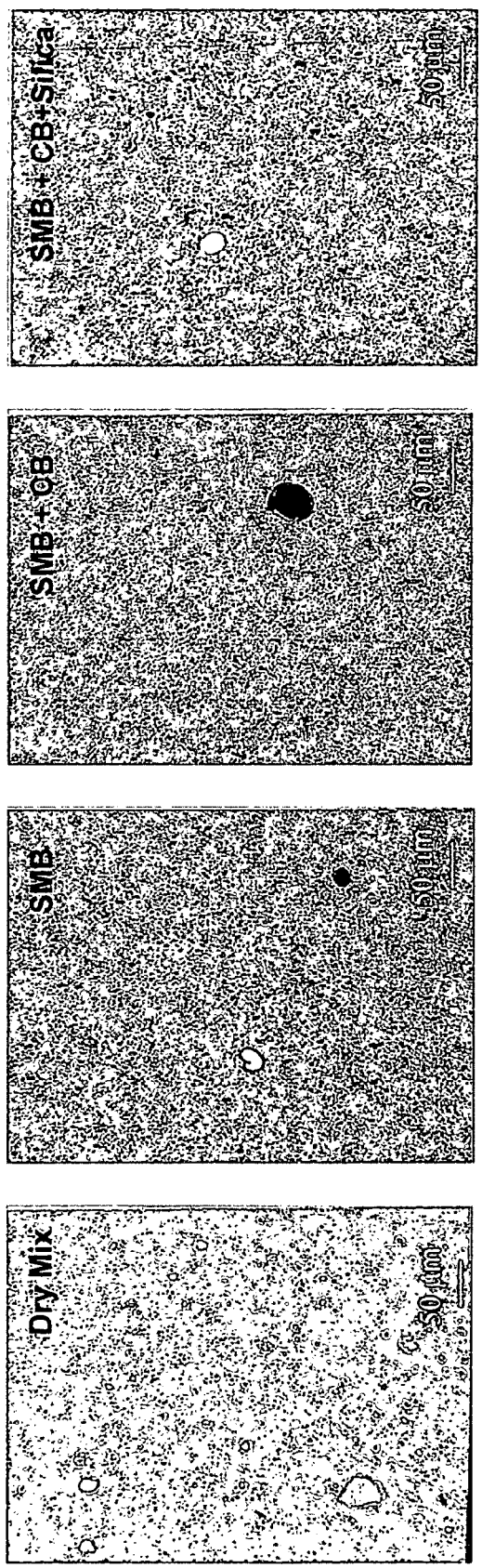
FIG. 4 illustrates a series of optical micrographs (Carl Zeiss II optical microscope) of four rubber stocks prepared in Example 7, after compounding and curing. The degree of magnification is illustrated by the 50 micron bar. The stocks contained silica and carbon black.

Optical micrographs (Carl Zeiss II optical microscope) of four of the stocks after compounding and curing are illustrated in FIG. 4. The degree of magnification is illustrated by the 50 micron bar. The micrographs indicate that the dispersion of silica (white dots) and carbon black (black dots) were poor/fair in the dry mix comparison stock C-5, and excellent/good in the stock containing SMB-4. The additional carbon black in the SMB-4 stocks (SMB+CB) during dry mix did not disperse as well as when the carbon black was passed through the media mill with the ground silica slurry (SMB-4). However, both the SMB-4+CB stock and the SMB-4+Si/CB showed better filler dispersion than that of the dry mix comparison stock C-5.

The low compound Mooney viscosity of the SMB-4 stock provided the opportunity to reduce the amount of processing oil, offering additional improvement in the compound properties. For example, when the oil was reduced by 12.5 phr (SMB-oil), the compound Mooney viscosity (45.8) was only slightly higher than that of the dry mix comparison (C-5) and lower than that of the higher silica loading comparison (C-6). The compound SMB-oil still had a significant reduction in hysteresis, compared to C-6, as illustrated by the decrease in tan δ at 50° C.

Figure 5:
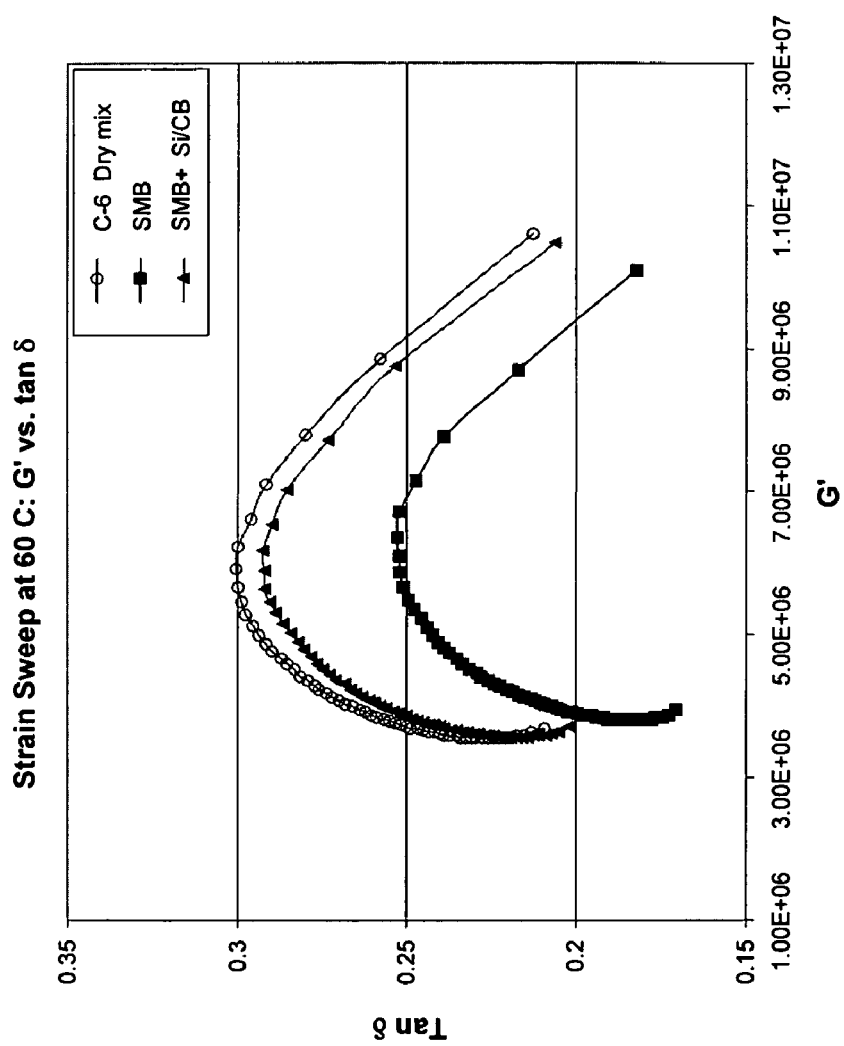
FIG. 5 illustrates a strain sweep analysis at 60° C. of the G' vs. the tan $\delta$ (dynamic mechanical properties) of the stocks from FIG. 4 and Example 7.

Adding extra carbon black and/or silica during the dry mix (SMB+CB, SMB+Si/CB) significantly increased the compound Mooney viscosity to 42; however this value was still lower than the Mooney value of C-6 (45.8), and the benefit of hysteresis reduction remained. As shown in FIG. 5, the stock (SMB+Si/CB) had a lower tan δ than the comparison stock C-6 in the whole range of strain amplitude in the test. A significant improvement was also seen in the SMB-oil stock. While maintaining the same G' as the dry mix comparison (C-5) the reduced-oil stock had reduced hysteresis of about 20%.

Example 8

Media Mill Grinding of a Mixture of Multiple Polymers and Multiple Fillers

Figure 6:
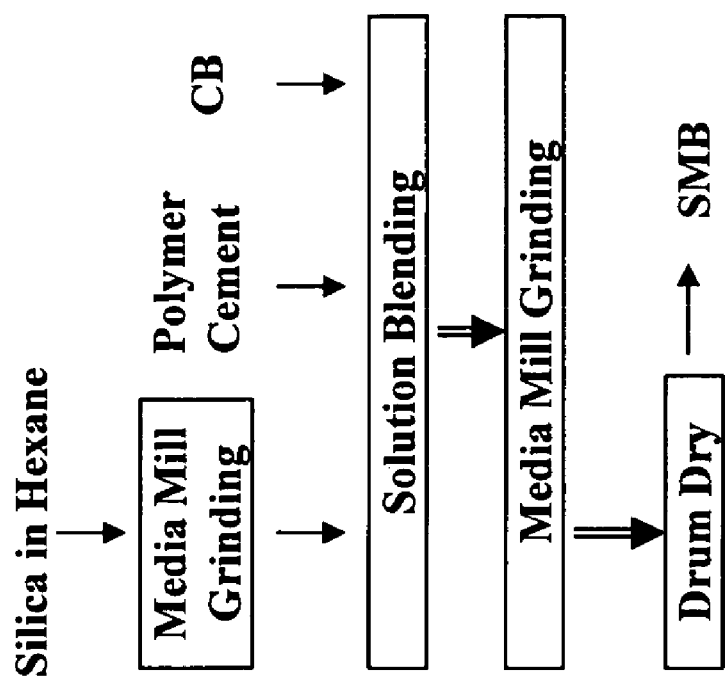
FIG. 6 illustrates an SMB process (Example 8) in which a mixtures of multiple polymers and multiple fillers are ground together in a media mill to form a solution masterbatch that is then dried.

This example illustrates a SMB process in which a mixture of more than one polymer cement and multiple fillers are ground together in a media mill to form a solution masterbatch that is then dried. For example, in a typical passenger tire tread compound, both SBR and natural rubber can be used, with mixed fillers of silica and carbon black. A process for making a SMB compound using multiple polymers and multiple fillers is illustrated in FIG. 6. In this example, a powdered silica Flo-gard SP was dried in an oven at 70° C. for 3 days, dispersed in hexane and ground in a media mill via a single pass. Carbon black was also dried under the same conditions. Natural rubber or Natsyn® 2210 (a synthetic polyisoprene) were dissolved in toluene. A TEOS-terminated SSBR cement (in hexane) was also employed.

Seven stocks were compounded with oil, and the added ingredients illustrated in Table 7, using the resulting SMB-5 compound:
1. Dry mix comparison C-7: SBR/NR/Silica/Carbon Black/oil=70/30/21/21/9.1;
2. Dry mix comparison C-8: SBR/NR/Silica/Carbon Black/oil=70/30/18/18/9.1;
3. SMB-5: SBR/Natsyn®2210/Silica/Carbon Black/oil=70/30/21/21/9.1;
4. SMB-5: SBR/Natsyn®2210/Silica/Carbon Black/oil=70/30/18/18/9.1;
5. SMB-5: SBR/NR/Silica/Carbon Black/oil=70/30/21/21/9.1;
6. SMB-5: SBR/NR/Silica/Carbon Black/oil=70/30/21+3/21+3/9.1 (3 phr of each of silica and carbon black were added in the dry mix);
7. SMB-5: SBR/NR/Silica/Carbon Black/oil=70/30/21/21/7.1 (reduced oil).

TABLE 7

| INGREDIENT | AMOUNT (phr) |
| --- | --- |
| Polymer (SSBR) | 70 |
| Polymer (Polyisoprene) | 30 |
| Silica | 21 |
| Carbon Black | 21 |
| Aromatic Oil | 9.1/7.1 |
| Stearic Acid | 3 |
| Wax | 1 |
| Santoflex 13 | 0.95 |
| Sorbitan Monooleate | Variable |
| Remill | |
| Si69 | 2.1 |
| Final Stage | |
| Zinc Oxide | 2.5 |
| DPG | 0.2 |
| CBS[4] | 2.0 |
| Sulfur | 1.85 |

Figure 7:
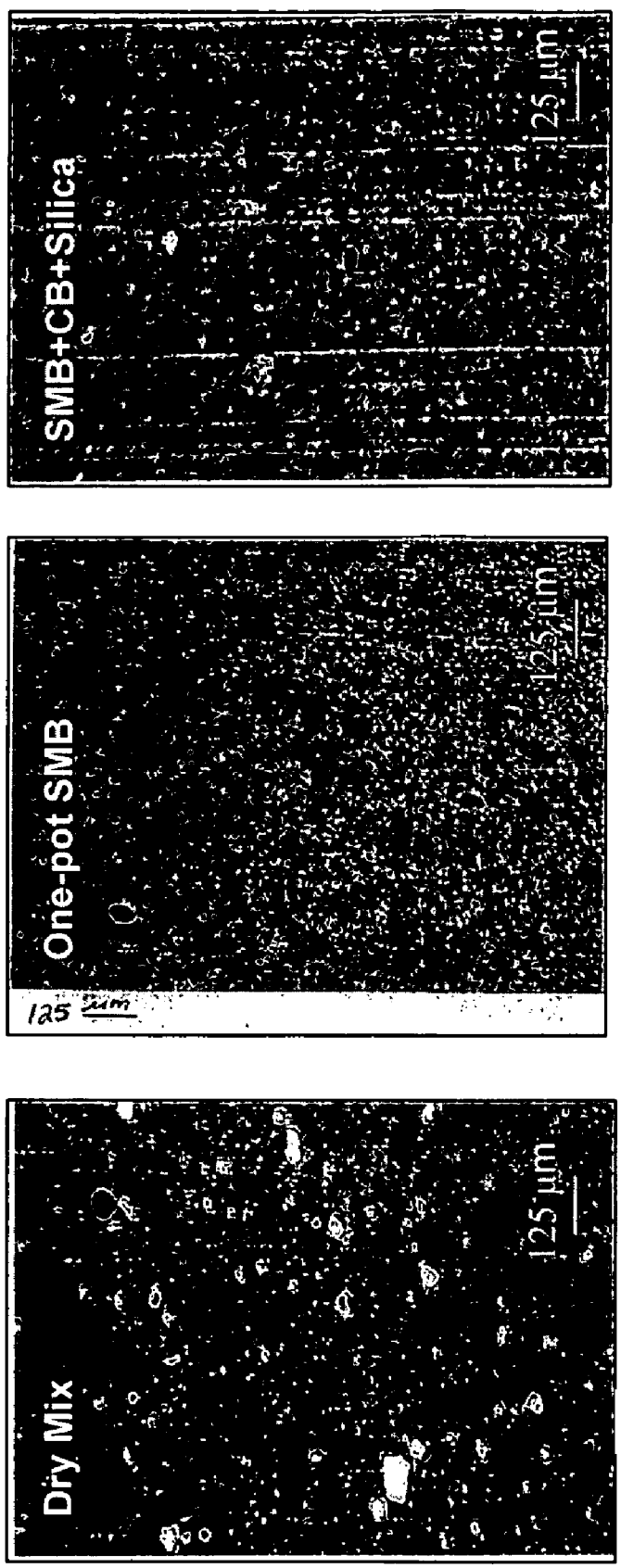
FIG. 7 illustrates optical micrographs of the rubber stocks according to Example 8 and FIG. 6 after compounding, showing size bars of 125 microns.

Optical micrographs of comparison stock 1 (C-7) and SMB-5 stocks 5 and 6 are illustrated in FIG. 7 showing size bars of 125 microns (upper row) and 50 microns (lower row). The dry mix comparison stock (C-7) has poor silica dispersion and poor carbon black dispersion. SMB-5 stock 5 shows excellent silica and carbon black dispersion. However, the dry mix addition of extra silica and extra carbon black in the SMB-5 stock 6 decreases the dispersion of both fillers, compared to the SMB-5 stock 5.

The compound properties of stock 1 (C-7) and SMB-5 stocks 5, 6 and 7 are illustrated in Table 8. All of the SMB-5 stocks show an increase in filler dispersion compared to the dry mix comparison stock C-7. However, as noted in the optical micrographs described above, the addition of silica and carbon black to the SMB-5 stock 6 in the dry mix decreases the dispersion index in comparison to the SMB-5 stock 5 without the added fillers. It is notable that the reduction of oil in SMB-5 stock 7 provides a dispersion index that is comparable to that of the SMB-5 with the full amount of oil (SMB-5 stock 5).

TABLE 8

| | C-7 stock 1 | SMB-5 stock 5 | SMB-5 + Si/CB stock 6 | SMB-5-oil stock 7 |
| --- | --- | --- | --- | --- |
| | | Formulation Si/CB/oil | | |
| | 21/21/9.1 | 21/21/9.1 | 21 + 3/21 + 3/9.1 | 21/21/7.1 |
| Rheometer | | | | |
| MH (lb-in) | 14.70 | 14.48 | 16.26 | 15.36 |
| ML (lb-in) | 1.12 | 1.29 | 1.56 | 1.39 |
| t₉₀ (min.) | 5.35 | 5.58 | 5.79 | 5.14 |
| Dispersion Index (%) | 69.3 | 98.3 | 89.5 | 95.6 |
| Wet Stanley London Pendulum Rebound | 59.0 | 58.0 | 57.0 | 56.0 |
| 23° C. | 51.4 | 52.0 | 47.8 | 52.8 |
| 50° C. | 66.4 | 67.0 | 63.0 | 67.8 |
| Strain Sweep | | | | |
| tan δ, 60° C. | 0.108 | 0.103 | 0.125 | 0.090 |
| ΔG', 60° C. (MPa) | 0.488 | 0.465 | 0.804 | 0.451 |
| Micro Dumbell Tensile | | | | |
| 100% Modulus (MPa), 23° C. | 2.27 | 2.15 | 2.45 | 2.31 |
| 300% Modulus (MPa), 23° C. | 7.30 | 7.36 | 8.43 | 8.19 |
| 100% Modulus (MPa), 100° C. | 2.14 | 2.02 | 2.23 | 2.20 |
| TB (MPa), 100° C. | 6.32 | 6.93 | 7.97 | 6.51 |
| Ring Tear (171° C.) | | | | |
| Tear Strength (KN/m) | 4.73 | 5.69 | 7.34 | 6.21 |
| Travel at tear (%) | 112 | 130 | 144 | 133 |

Figure 8:
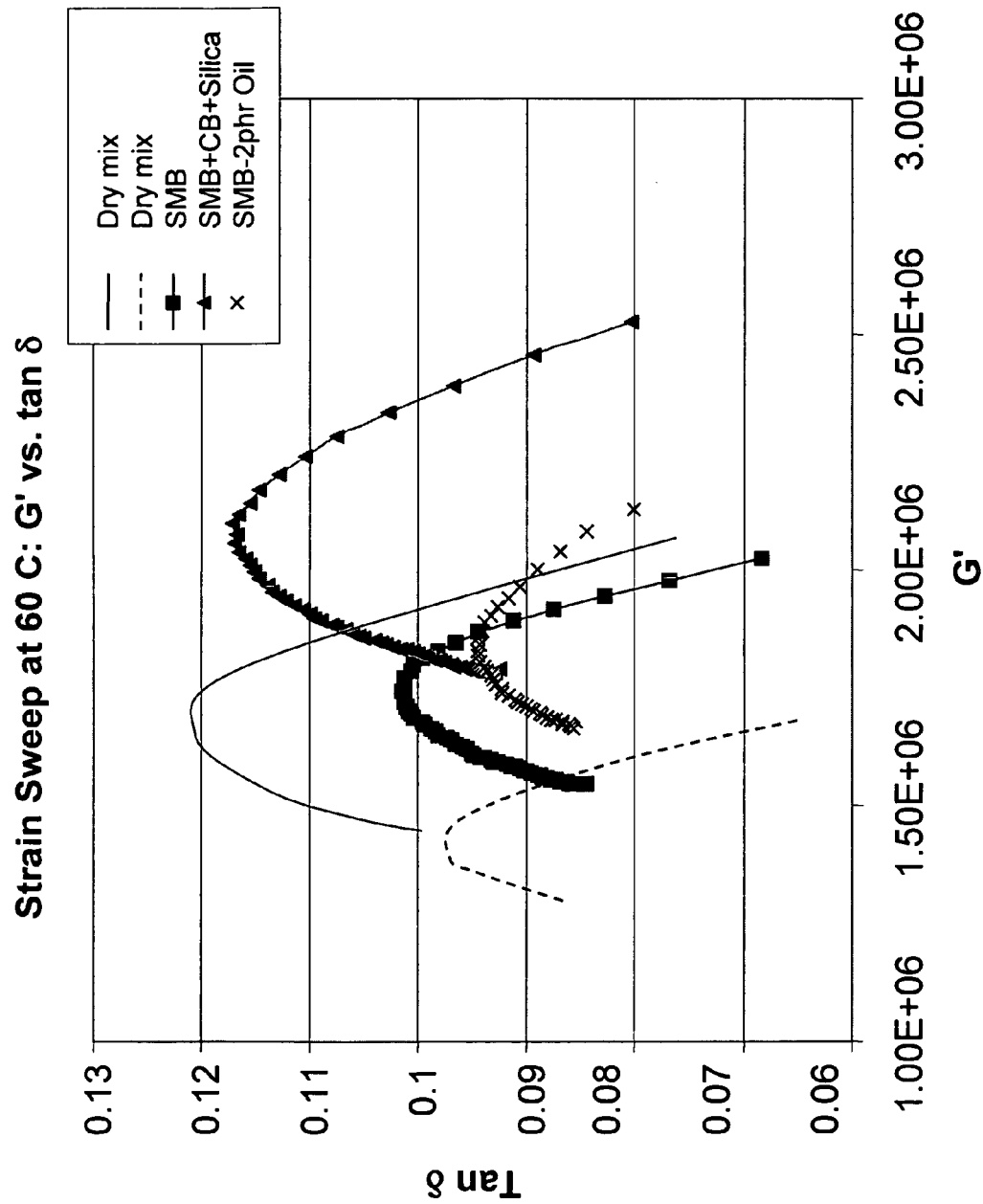
FIG. 8 illustrates a strain sweep analysis at 60° C. of the G' vs. the tan $\delta$ of rubber stocks according to Example 8.

A strain sweep analysis at 60° C. of the G' vs. the tan δ (dynamic mechanical properties) is provided in FIG. 8. The G' vs. tan δ curve moves diagonally as the filler 5 loading is increased. The curves of all the SMB-5 stocks are shifted down, i.e., a lower tan δ with a comparable G'. Reducing the amount of processing oil further enhances the SMB-5 benefit by reducing the tan δ and increasing the G' simultaneously.

When additional fillers are added into the SMB-5 stock during subsequent dry mixing, the G' vs. tan δ curve shifts in a up and right position, and the SMB-5 benefit is decreased. However, in comparison with the dry mix stocks, stock 7

(reduced oil) has a higher G' at a comparable tan δ, indicating that a significant amount of the benefit of the SMB-5 stock has been retained.

Example 9

Media Mill Grinding of Silica Surface Treated with a Silane Coupling Agent and SMB-6 Compounds Formed Therefrom Ciptane® LP (powdered silica, surface-treated with a mercaptosilane silica coupling agent) was dried at 70° C. overnight and dispersed in hexane at a concentration of about 10 wt %. Half of the dispersion was processed through the media mill in one pass and ground to a particle size of 12 microns (mean size). The other half of the dispersion was blended in a Waring blender for one minute with SBR polymer cement (in hexane) without grinding. Four SMB-6 compounds were prepared, based on 50 phr silica, 100 phr isopropanol-terminated (non-functionalized) SBR, and drum dried. The compounds were used in a compounding dry mix, with variable amounts of oil added during mixing.

8. SMB-6: Blend of Ciptane® LP and SBR; 10 phr of oil added in compounding dry mix;
9. SMB-6: Blend of ground Ciptane® LP and SBR; 10 phr of oil added in compounding dry mix;
10. SMB-6: Blend of ground Ciptane® LP and SBR; 5 phr of oil added in compounding dry mix (reduced oil);
11. SMB-6: Blend of Ciptane® LP, SBR and SMO (4.8% by weight, based on the silica); 10 phr of oil added in compounding dry mix;
12. SMB-6: Blend of ground Ciptane® LP, SBR and SMO (4.8% by weight, as above); 10 phr of oil added in compounding dry mix;
13. SMB-6: Blend of ground Ciptane® LP, SBR and SMO (4.8% by weight, as above); 5 phr of oil added in compounding dry mix (reduced oil).

The above six SMB-6 compounds were then mixed in a standard silica formulation in a Brabender mixer, without the addition of further silica coupling agents. The physical properties of these six compounds are listed in Table 9 All six stocks have a low compound Mooney viscosity (less than about 36). The stocks containing media mill-ground Ciptane LP showed about a 40% reduction in the Payne effect (ΔG'). The stocks containing a reduced oil loading showed both a reduced Payne effect and reduced hysteresis (tan δ at 60° C.), without compromising compound processability (Mooney viscosity).

TABLE 9

| | | Stock No. | | | | | |
|---|---|---|---|---|---|---|---|
| | | 8 | 9 | 10 | 11 | 12 | 13 |
| Preparation | grinding | none | 1 pass | 1 pass | none | 1 pass | 1 pass |
| | SMO | none | none | none | yes | yes | yes |
| Added Oil | | 10 phr | 10 phr | 5 phr | 10 phr | 10 phr | 5 phr |
| Rheometer | | | | | | | |
| MH (lb-in) | | 20.04 | 19.08 | 14.28 | 17.96 | 16.98 | 16.06 |
| ML (lb-in) | | 1.13 | 1.34 | 0.92 | 0.81 | 0.75 | 0.67 |
| $t_{90}$ (min.) | | 16.30 | 18.48 | 19.13 | 16.38 | 17.29 | 17.52 |
| $ML_{1+4}$ | | 19.2 | 23.4 | 30.0 | 29.0 | 28.9 | 35.2 |
| Dynastat | | | | | | | |
| tan δ, 23° C. | | 0.150 | 0.147 | 0.134 | 0.146 | 0.142 | 0.135 |
| tan δ, 50° C. | | 0.143 | 0.153 | 0.137 | 0.150 | 0.149 | 0.140 |
| G', 60° C. (MPa) | | 1.875 | 1.577 | 1.564 | 1.689 | 1.533 | 1.475 |
| Strain Sweep | | | | | | | |
| tan δ, 60° C. | | 0.149 | 0.159 | 0.138 | 0.159 | 0.147 | 0.146 |
| ΔG', 60° C. (MPa) | | 0.537 | 0.330 | 0.142 | 0.482 | 0.274 | 0.244 |
| Micro Dumbell Tensile | | | | | | | |
| 100% Modulus (MPa), 23° C. | | 2.09 | 1.88 | 1.86 | 1.84 | 1.79 | 1.92 |
| 300% Modulus (MPa), 23° C. | | 6.13 | 5.77 | 6.67 | 5.52 | 5.71 | 6.26 |
| TB (MPa) | | 13.09 | 14.40 | 12.58 | 14.83 | 13.34 | 16.02 |
| Elong. at break (%), 23° C. | | 583 | 682 | 513 | 715 | 635 | 655 |
| Bound rubber (%) | | 30.28 | 36.72 | 44.11 | 29.21 | 30.23 | 36.41 |

Example 10

Compound Properties of Rubber Stocks Made With SMB-7 Blends of Ground Silica Surface-Treated with Silica Coupling Agent The following SMB-7 compounds were prepared and used in a dry mix compounding formulation (see Table 1) except that no silica coupling agents were added in the remill for the SMB-7 compounds; however a silica coupling agent was added in stock 14, the dry mix comparison (C-9):

14. Dry mix comparison (C-9): SBR and 50 phr silica with additional compounding ingredients (Table 1). The silica coupling agent, 3-mercaptopropyl trimethoxysilane, 2.5% by weight based on the silica, was added in the remill.
15. SMB-7: blend of 50 phr Ciptane® LP and SBR without any grinding;
16. SMB-7: blend of 50 phr media mill-ground Ciptane® LP and SBR;
17. SMB-7: media mill ground blend of both 50 phr Ciptane® LP and SBR (i.e., the Ciptane LP and the SBR were blended together prior to grinding).

The silica loading of all SMB-7 stocks was verified by TGA of the SMB-7 and the mixed compounds.

Figure 9:
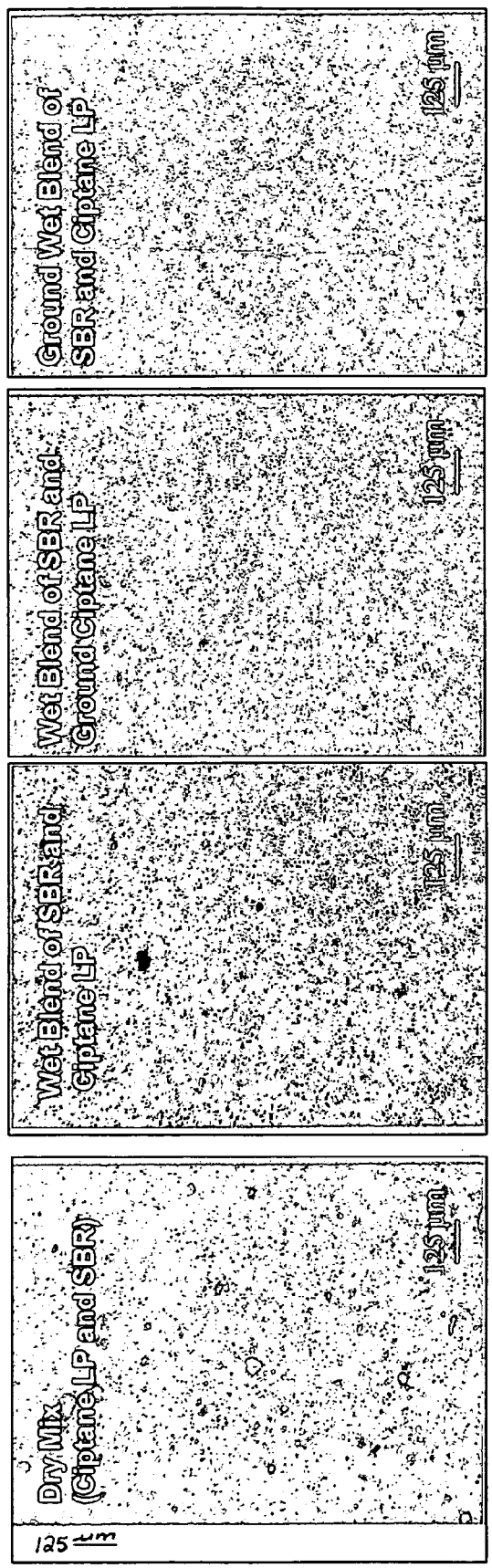
FIG. 9 illustrates optical microscopy of each of four stocks prepared according to Example 10. From left to right, the micrographs illustrate silica dispersion in SBR rubber, as follows: dry mix comparison SBR and 50 phr Ciptane® LP; SMB blend of 50 phr Ciptane® LP and SBR without any grinding; SMB blend of 50 phr media mill-ground Ciptane® LP and SBR; SMB media mill ground blend of both 50 phr Ciptane® LP and SBR (i.e., the Ciptane® LP and the SBR were blended together prior to grinding).
Figure 10:
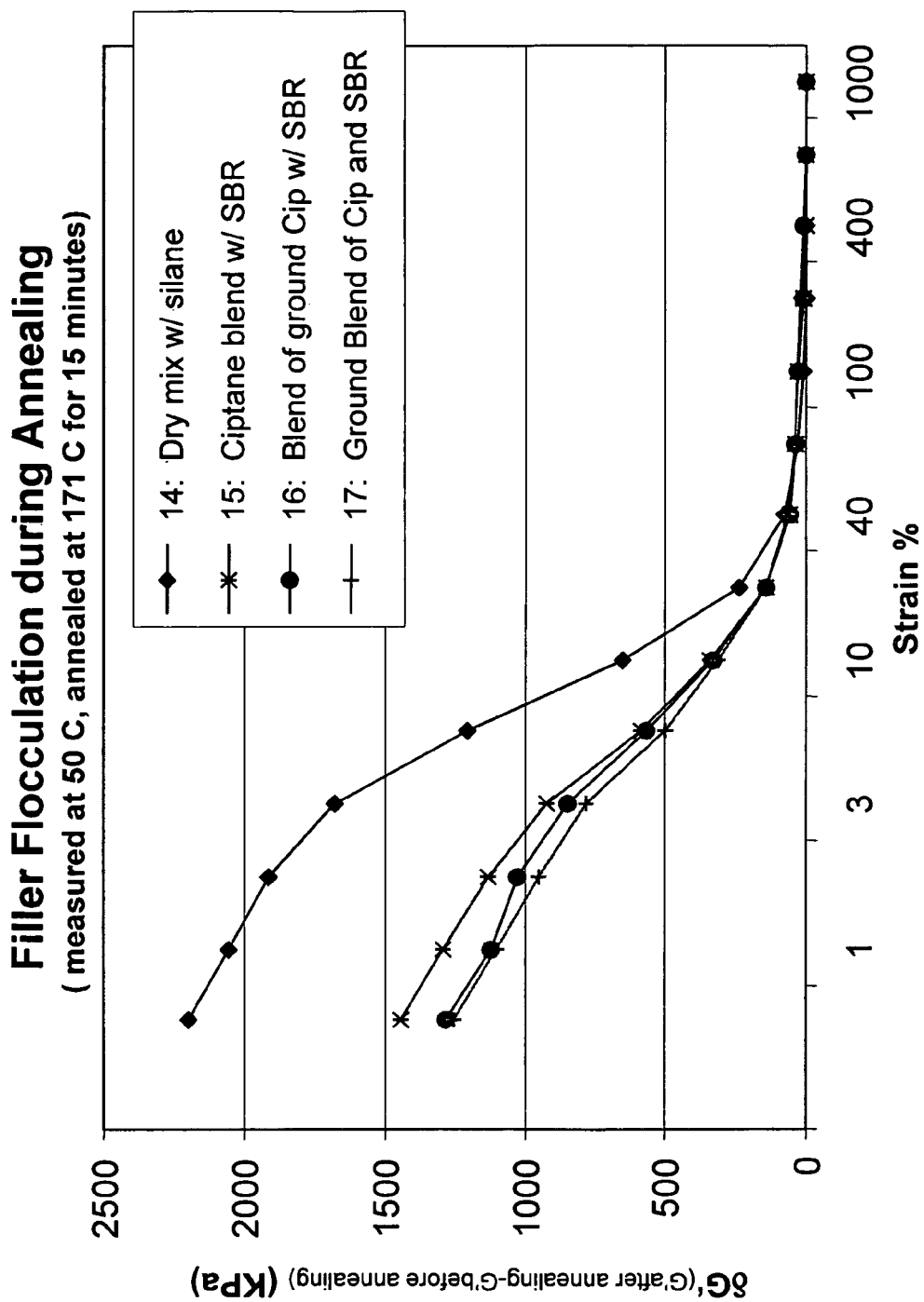
FIG. 10 illustrates a study of the rubber stocks of Example 10, indicating that the ground stocks had a significantly reduced filler flocculation ($\delta$G').

The physical properties of the resulting compounded stocks are listed in Table 10. The media mill grinding of the surface treated silica (stock 16) and of the ground combination of the surface treated silica and the SBR (stock 17) improved the properties of the rubber stocks, compared to the dry mix comparison C-9 and the wet blend of the treated silica and SBR (stock 15). For example, the pendulum rebound at 50° C. was increased from the comparison value of 58.4 to 62.6 (stock 15), 64.0 (stock 16) and 64.8 (stock 17), respectively. The bound rubber of the ground stocks was also increased from 25.8 (stock 15) to 31.9 (stock 16) and 35.0 (stock 17), respectively. Optical microscopy of each of the four stocks, illustrated in FIG. 9, shows the significant improvement in silica dispersion in the stocks 16 and 17 containing the media mill ground silica, and the ground combination of the silica and SBR, respectively. A filler flocculation study, illustrated in FIG. 10, indicates that the ground stocks 16 and 17 had a significantly filler flocculation ($\delta G'$).

TABLE 10

| | Stock No. | | | |
|---|---|---|---|---|
| | Comparison C-9 (14) | 15 | 16 | 17 |
| Rheometer | | | | |
| MH (lb-in) | 34.46 | 18.37 | 15.84 | 14.14 |
| ML (lb-in) | 5.29 | 0.60 | 0.40 | 0.37 |
| $t_{90}$ (min.) | 27.99 | 21.80 | 22.13 | 23.36 |
| Dispersion Index (%) | 22.0 | 51.0 | 59.0 | 36.0 |
| Wet Stanley London | 66.0 | 65.0 | 65.0 | 66.0 |
| Bound Rubber (%) | NA | 25.8 | 31.9 | 35.0 |
| Pendulum Rebound | | | | |
| 23° C. | 43.6 | 49.6 | 48.6 | 51.0 |
| 50° C. | 58.4 | 62.6 | 64.0 | 64.8 |
| Dynastat | | | | |
| tan δ, 23° C. | 0.114 | 0.135 | 0.135 | 0.136 |
| tan δ, 50° C. | 0.112 | 0.143 | 0.135 | 0.131 |
| Strain Sweep | | | | |
| tan δ, 60° C. | 0.171 | 0.143 | 0.137 | 0.136 |
| ΔG', 60° C. (MPa) | 2.737 | 0.397 | 0.270 | 0.196 |
| Micro Dumbell Tensile | | | | |
| 100% Modulus (MPa), 23° C. | 2.34 | 1.90 | 1.89 | 1.89 |
| 200% Modulus (MPa), 23° C. | 4.11 | 3.88 | 3.96 | 3.90 |
| TB (MPa) | 11.3 | 13.9 | 16.4 | 15.4 |
| Elong. at break (%), 23° C. | 567 | 629 | 681 | 656 |
| Toughness (MPa), 23° C. | 32.8 | 41.3 | 50.5 | 46.2 |
| 100% Modulus (MPa), 100° C. | 1.89 | 1.65 | 1.65 | 1.64 |
| TB (MPa) 100° C. | 5.57 | 6.41 | 7.02 | 6.33 |
| Elong. at break, 100° C. (%) | 375 | 391 | 405 | 379 |
| Toughness (MPa), 100° C. | 11.5 | 12.4 | 13.8 | 11.8 |
| 100% Modulus (MPa), 170° C. | 2.10 | 1.79 | 1.84 | 1.94 |
| TB (MPa) 170° C. | 3.94 | 4.30 | 4.60 | 4.18 |
| Elong. at break, 170° C. (%) | 233 | 264 | 267 | 233 |
| Toughness (Mpa), 170° C. | 5.36 | 6.14 | 6.46 | 5.26 |
| Ring Tear (100° C.) | | | | |
| Tear Strength (KN/m) | 17.90 | 19.00 | 19.00 | 14.20 |
| Travel at tear (%) | 354 | 384 | 375 | 311 |

NA = not available

Example 11

Preparation of SMB-8 by Steam Desolventization, Using Different Types of Silica, and Rubber Stocks Prepared Therefrom An SBR (non-functionalized) was dissolved in hexane to make a SBR cement of 15-20 weight percent. SMB-8 stocks were prepared with three different types of silica: (a) powdered silica (Flo-gard® SP); (b) media mill-ground Flo-gard® SP (see Example 1); and (c) surface-treated powdered silica (Ciptane LP). For each stock, the particular silica was mixed with the SBR cement in a Waring blender, prior to being steam desolventized. The water temperature in the stirring desolventization tank was 80° C. (i.e., above the boiling point of the hexane). After desolventization, the crumb was dried in a vacuum oven to remove the water and residual solvent.

Five stocks were prepared, as follows:

18. Comparison stock C-10, dry mix of steam desolventized, vacuum dried SBR, 50 phr Flo-gard® SP, 10% by weight Si69 silica coupling agent, based on the silica;
19. SMB-8: SBR blended with 50 phr of Flo-gard® SP;
20. SMB-8: SBR blended with 50 phr of media mill-ground Flo-gard® SP slurry (see Example 1);
21. SMB-8: SBR blended with 50 phr of Ciptane® LP; and
22. Comparison stock C-11, dry mix of steam desolventized, vacuum dried SBR, 50 phr Flo-gard SP, 2.5% by weight 3-mercaptopropyl trimethoxysilane silica coupling agent, based on the silica.

Figure 11:
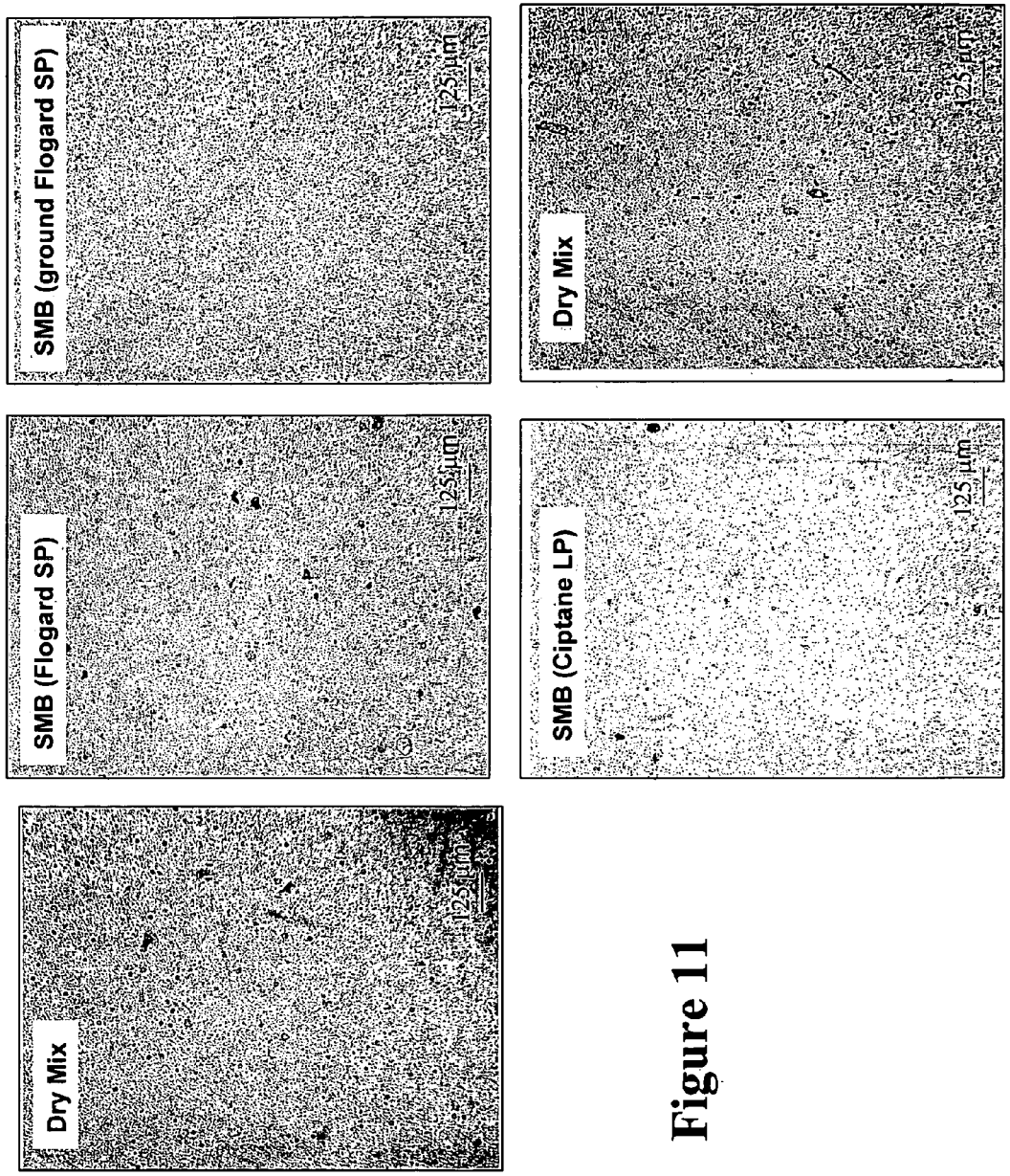
FIG. 11 illustrates optical micrographs of dispersion of silica in rubber stocks prepared from solution masterbatches using steam desolventization, different types of powdered silica and ground and unground silica, as in Example 11.

The compound processing characteristics and mechanical properties of the five stocks are summarized in Table 11. Stocks 20 and 21 had the best silica dispersion, as shown by the dispersion index. The excellent dispersion of the silica was also demonstrated by optical microscopy, shown in FIG. 11, representing stocks 18 through 22, respectively. The cut growth test (Table 9) indicated the strong correlation between the silica dispersion and chipping/wear resistance.

TABLE 11

| | Stock No. | | | | |
|---|---|---|---|---|---|
| | C-10 (18) | 19 | 20 | 21 | C-11 (22) |
| | | | Formulation | | |
| | dry mix SBR desolventized | Flo-gard SP | ground Flo-gard SP | Ciptane LP | dry mix SBR desolventized |
| Silica wt % theoretical | 28.63 | 28.63 | 28.63 | 28.38 | 28.63 |
| Silica wt % actual (TGA) | 29.34 | 28.82 | 30.18 | 26.60 | 29.42 |
| Rheometer | | | | | |
| MH (lb-in) | 20.62 | 19.39 | 18.61 | 20.66 | 19.87 |
| ML (lb-in) | 2.99 | 2.48 | 2.55 | 3.28 | 2.77 |
| $t_{90}$ (min.) | 7.05 | 6.64 | 7.05 | 8.58 | 6.48 |
| $ML_{1+4}$ | 55.38 | 46.72 | 46.22 | 64.51 | 57.10 |
| Dispersion Index (%) | 60.6 | 86.5 | 86.8 | 86.1 | 71.4 |
| Wet Stanley London | 57.0 | 57.0 | 57.0 | 54.0 | 56.0 |
| Bound Rubber (%) | 30.69 | 35.07 | 37.95 | 35.58 | 31.67 |
| Cut Growth Test dc/dn (nm/cycle) | 100.0 | 50.0 | 40.0 | 42.5 | 105 |
| Pendulum Rebound | | | | | |
| 23° C. | 48.6 | 48.8 | 49.2 | 51.4 | 47.8 |
| 50° C. | 50.4 | 50.2 | 49.6 | 51.6 | 47.4 |
| Dynastat | | | | | |
| tan δ, 23° C. | 0.159 | 0.155 | 0.161 | 0.129 | 0.158 |
| tan δ, 50° C. | 0.155 | 0.142 | 0.146 | 0.107 | 0.149 |
| Strain Sweep | | | | | |
| tan δ, 60° C. | 0.147 | 0.142 | 0.143 | 0.103 | 0.144 |
| ΔG', 60° C. (MPa) | 6.254 | 6.264 | 5.532 | 3.947 | 6.062 |
| Micro Dumbell Tensile | | | | | |
| 100% Modulus (MPa), 23° C. | 2.16 | 2.23 | 2.15 | 2.30 | 2.06 |
| 200% Modulus (MPa), 23° C. | 4.34 | 4.33 | 4.32 | 4.94 | 4.12 |
| TB (MPa) | 21.8 | 19.3 | 20.6 | 17.8 | 23.0 |
| Elong. at break (%), 23° C. | 718 | 673 | 719 | 548 | 722 |
| Toughness (MPa), 23° C. | 68 | 56.9 | 66.7 | 42.9 | 69.8 |

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A method for making a solution masterbatch containing a diene elastomer in an organic solvent and a reinforcing silica filler dispersed therein, comprising the steps of:
    (a) continuously mixing an unhydophobized precipitated silica having a first average particle size in a first organic solvent to form a silica slurry having a substantially even dispersion of the silica;
    (b) grinding the silica slurry in a grinding apparatus, while maintaining the dispersion of the silica, to form a ground silica slurry having a reduced second average particle size;
    (c) mixing the ground silica slurry with a diene elastomer in a second organic solvent; and
    (d) desolventizing the mixture produced in step (c) to form a solution masterbatch preparation.

2. The method of claim 1, wherein the grinding apparatus comprises a media mill.

3. The method of claim 1, wherein the first average particle size of the silica in step (a) is about 20 to about 200 microns.

4. The method of claim 3, wherein the first average particle size is about 30 to about 100 microns.

5. The method of claim 1, wherein the reduced second average particle size of the ground silica slurry in step (b) is about 1 to about 20 microns.

6. The method of claim 5, wherein the reduced second average particle size is about 1 to about 10 microns.

7. The method of claim 1, wherein the precipitated silica in step (a) having a first average particle size is selected from the group consisting of ground pelletized silica, ground granulated silica, powdered silica, and mixtures thereof.

8. The method of claim 7, wherein the precipitated silica comprises powdered silica.

9. The method of claim 1, wherein the precipitated silica in step (a) is pre-treated with a silica coupling agent.

10. The method of claim 1, wherein the organic solvents in steps (a) and (c) are the same or different.

11. The method of claim 1, wherein the ground silica in the solution masterbatch is present in an amount of about 10 phr to about 120 phr by weight.

12. The method of claim 11, wherein the ground silica in the solution masterbatch is present in an amount of about 20 phr to about 85 phr.

13. The method of claim 1, wherein the steps (a), (b) and (c) include the optional substeps of mixing the silica with optional ingredients selected from the group consisting of one or more additional fillers, one or more additional elastomers, a silica coupling agent, a surfactant, and mixtures thereof, and the steps (a), (b) and (c) further include the optional substep of grinding the mixture of the silica and the optional ingredients in one or more additional grinding substeps, prior to the desoventizing step (d).

14. The method of claim 13, wherein the additional fillers are selected from the group consisting of reinforcing fillers, non-reinforcing fillers, polymer microparticle fillers, polymer nanoparticle fillers, and mixtures thereof.

15. The method of claim 14, wherein the additional reinforcing filler comprises carbon black.

16. A method for making a solution masterbatch containing a diene elastomer in an organic solvent and a reinforcing silica filler dispersed therein, comprising the steps of:
（a) continuously mixing an unhydrophobized precipitated silica having a first average particle size with a diene elastomer in an organic solvent;
（b) grinding the mixture of the precipitated silica and the diene elastomer in a grinding apparatus to form a ground elastomer-silica mixture wherein the silica is dispersed in the elastomer and has a reduced second average particle size; and
（c) desolventizing the mixture produced in step (b) to form a solution masterbatch preparation.

17. The method of claim 16, wherein the grinding apparatus comprises a media mill.

18. The method of claim 16, wherein the first average particle size of the silica in step (a) is about 20 to about 200 microns.

19. The method of claim 16, wherein the reduced second average particle size of the silica in the ground elastomer-silica mixture is about 1 to about 20 microns.

20. The method of claim 16, wherein the precipitated silica in step (a) is selected from the group consisting of ground pelletized silica, ground granulated silica, powdered silica, and mixtures thereof.

21. The method of claim 16, wherein the precipitated silica comprises powdered silica.

22. The method of claim 16, wherein the precipitated silica in step (a) is pre-treated with a silica coupling agent.

23. The method of claim 16, wherein the silica in the solution masterbatch is present in an amount of about 10 phr to about 120 phr by weight.

24. The method of claim 16, wherein the steps (a) and (b) include the optional substeps of mixing the silica and elastomer with optional ingredients selected from the group consisting of one or more additional fillers, one or more additional elastomers, a silica coupling agent, a surfactant, and mixtures thereof, and the steps (a) and (b) further include the optional substep of grinding the mixture of the silica, the elastomer and the optional ingredients in one or more additional grinding substeps, prior to the desolventizing step (c).

25. The method of claim 24, wherein the additional fillers are selected from the group consisting of reinforcing fillers, non-reinforcing fillers, polymer microparticle fillers, polymer nanoparticle fillers, and mixtures thereof.

26. The method of claim 25, wherein the additional reinforcing filler comprises carbon black.

27. The method of claim 16, wherein the precipitated silica in step (a) has an average particle size of about 20 to about 200 microns.

28. The method of claim 27, wherein the average particle size is about 30 to about 100 microns.

29. The method of claim 16, wherein the silica in the ground silica/elastomer slurry has a reduced average particle size of about 1 to about 20 microns.

30. The method of claim 29, wherein the reduced average particle size is about 1 to about 10 microns.

31. A vulcanizable rubber compound having improved silica dispersion, comprising:
（a) a desolventized solution masterbatch prepared by the method according to claim 1 and comprising a diene elastomer and an unhydrophobized ground silica having an average particle size of about one to about 20 microns substantially evenly dispersed therein, wherein the amount of the ground silica in the solution masterbatch is about 10 phr to about 120 phr;
（b) optionally an additional elastomer, wherein the total amount of the diene elastomer in the solution masterbatch plus the optional additional elastomer is 100 parts;
（c) optionally an additional reinforcing filler;
（d) optionally about 2 to about 15 percent by weight, based on the total weight of the silica, of a silica coupling agent;
（e) optionally a process oil; and
（f) a cure agent.

32. The vulcanizable rubber compound of claim 31, wherein the optional additional reinforcing filler is selected from the group consisting of precipitated silica, carbon black, clay, polymer microparticles, polymer nanoparticles, and combinations thereof.

33. A tire having at least one component comprising the vulcanizable rubber compound of claim 31.

34. A vulcanizable rubber compound having improved silica dispersion, comprising:
（a) a desolventized solution masterbatch prepared by the method according to claim 16 and comprising a diene elastomer and an unhydrophobized ground silica having an average particle size of about one to about 20 microns substantially evenly dispersed therein, wherein the amount of the ground silica in the solution masterbatch is about 10 phr to about 120 phr;
（b) optionally an additional elastomer, wherein the total amount of the diene elastomer in the solution masterbatch plus the optional additional elastomer is 100 parts;
（c) optionally an additional reinforcing filler;
（d) optionally about 2 to about 15 percent by weight, based on the total weight of the silica, of a silica coupling agent;
（e) optionally a process oil; and
（f) a cure agent.

35. The vulcanizable rubber compound of claim 34, wherein the optional additional reinforcing filler is selected from the group consisting of precipitated silica, carbon black, clay, polymer microparticles, polymer nanoparticles, and combinations thereof.

36. A tire having at least one component comprising the vulcanizable rubber compound of claim 34.

37. A desolventized solution masterbatch prepared by the method according to claim 1.

38. A desolventized solution masterbatch prepared by the method according to claim 16.

* * * * *